(12) United States Patent
Liu et al.

(10) Patent No.: US 10,191,944 B2
(45) Date of Patent: Jan. 29, 2019

(54) COLUMNAR DATA ARRANGEMENT FOR SEMI-STRUCTURED DATA

(71) Applicant: Oracle International Corporation, Redwood Shores, CA (US)

(72) Inventors: Zhen Hua Liu, San Mateo, CA (US); Beda Hammerschmidt, Los Gatos, CA (US); Douglas McMahon, Redwood City, CA (US); Ying Lu, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 15/078,713

(22) Filed: Mar. 23, 2016

(65) Prior Publication Data

US 2017/0116273 A1 Apr. 27, 2017

Related U.S. Application Data

(60) Provisional application No. 62/245,890, filed on Oct. 23, 2015.

(51) Int. Cl.
*G06F 17/30* (2006.01)

(52) U.S. Cl.
CPC .. *G06F 17/30466* (2013.01); *G06F 17/30911* (2013.01); *G06F 17/30917* (2013.01)

(58) Field of Classification Search
None
See application file for complete search history.

(56) References Cited

U.S. PATENT DOCUMENTS 5,870,761 A 2/1999 Demers et al.
5,951,695 A 9/1999 Kolovson
(Continued)

OTHER PUBLICATIONS

Sergey Melnik et al., "Dremel: Interactive Analysis of WebScale Datasets", Proceedings of the VLDB Endowment, vol. 3, No. 1, dated 2010, 10 pages.

(Continued)

*Primary Examiner* — Hung D Le
(74) *Attorney, Agent, or Firm* — Hickman Palermo Becker Bingham LLP; Khachatur V. Papanyan

(57) ABSTRACT

Techniques are provided for de-normalizing semi-structured hierarchical data into a virtual table. At least a portion of semi-structured data document collection is denormalized for improving the execution of queries that involves a traversal of the semi-structured data hierarchy of the semi-structured data document collection, in an embodiment. Based on the extracted schema of the semi-structured data, a de-normalized arrangement is generated, in which the hierarchical relationship of the semi-structured data is converted into a set of columns. The denormalized arrangement is materialized by applying the de-normalized arrangement onto the semi-structured data. The materialized arrangement, the virtual table, may be stored on a persistent storage or kept in volatile memory. The virtual table may be stored in one format on the persistent storage and in another format in the volatile memory. A received query that involves a traversal of the semi-structured data hierarchy is converted to a relational query that can be executed on the virtual table, in an embodiment. The execution of the relational query on the virtual table improves the performance in generating the resulting data set.

26 Claims, 14 Drawing Sheets

(56) References Cited

U.S. PATENT DOCUMENTS

| | | |
|---|---|---|
| 6,108,660 A | 8/2000 | Ikeda et al. |
| 6,122,630 A | 9/2000 | Strickler et al. |
| 6,370,622 B1 | 4/2002 | Chiou et al. |
| 6,611,898 B1 | 8/2003 | Slattery et al. |
| 7,031,994 B2 | 4/2006 | Lao et al. |
| 7,032,089 B1 | 4/2006 | Ranade et al. |
| 7,292,585 B1 | 11/2007 | Slaughter et al. |
| 7,496,589 B1 | 2/2009 | Jain et al. |
| 7,548,898 B1 | 6/2009 | Tarenskeen et al. |
| 7,570,451 B2 | 8/2009 | Bedillion et al. |
| 7,912,051 B1 | 3/2011 | Rowlands et al. |
| 8,306,951 B2 | 11/2012 | Ghosh et al. |
| 8,832,142 B2* | 9/2014 | Marwah ............ G06F 17/30477 707/769 |
| 8,972,337 B1* | 3/2015 | Gupta ............... G06F 17/30563 707/602 |
| 2003/0217236 A1 | 11/2003 | Rowlands |
| 2004/0073754 A1 | 4/2004 | Cypher |
| 2004/0122910 A1 | 6/2004 | Douglass et al. |
| 2004/0143581 A1 | 7/2004 | Bohannon et al. |
| 2004/0199552 A1 | 10/2004 | Ward et al. |
| 2005/0065927 A1 | 3/2005 | Nouri et al. |
| 2006/0010130 A1 | 1/2006 | Left et al. |
| 2007/0008890 A1 | 1/2007 | Tseitin et al. |
| 2007/0226214 A1 | 9/2007 | Smits et al. |
| 2008/0098044 A1 | 4/2008 | Todd |
| 2008/0140678 A1 | 6/2008 | Duzett |
| 2008/0155303 A1 | 6/2008 | Toeroe |
| 2008/0209009 A1 | 8/2008 | Katwala et al. |
| 2008/0215580 A1 | 9/2008 | Altinel et al. |
| 2008/0222111 A1 | 9/2008 | Hoang et al. |
| 2008/0222159 A1 | 9/2008 | Aranha et al. |
| 2009/0171679 A1 | 7/2009 | Salgado et al. |
| 2010/0306234 A1 | 12/2010 | Wang et al. |
| 2011/0071981 A1 | 3/2011 | Ghosh et al. |
| 2011/0289118 A1* | 11/2011 | Chen ................ G06F 17/30911 707/803 |
| 2012/0284228 A1 | 11/2012 | Ghosh et al. |
| 2013/0060814 A1* | 3/2013 | Hui ................... G06F 17/30917 707/802 |
| 2014/0143581 A1* | 5/2014 | Garg ........................ G06F 1/12 713/400 |
| 2014/0201129 A1* | 7/2014 | Gupta ............... G06F 17/30592 707/602 |
| 2014/0201244 A1* | 7/2014 | Zhou ....................... G06F 17/30 707/803 |
| 2015/0088813 A1* | 3/2015 | Lahiri ............... G06F 17/30292 707/609 |
| 2015/0088830 A1 | 3/2015 | Kamp et al. |
| 2016/0246825 A1* | 8/2016 | Li ..................... G06F 17/30315 |
| 2016/0321375 A1 | 11/2016 | Liu et al. |

OTHER PUBLICATIONS

Ailamaki, Anastassia, et al, "Weaving Relations for Cache Performance," Proceedings of the 27th International Conference on Very Large Data Bases, Rome, Italy, Sep. 11-14, 2001, 14 pages.

Elmasri, et al., "Fundatmentals of Database Systems," Third Edition, Addison-Wesley Longman, Inc., Copyright © 2000, ISBN—0-8053-1755-4, pp. 32, 70, 118, 131-132, 134, 155-159, 170, 252-254, 558, 569-573, 591-592, and 789-790 (26 pgs).

Goldman R. et al., "DataGuides: Enabling Query Formulation and Optimization in Semistructured Databases", Proceedings of International Conference on Very Largedata Bases, dated Aug. 26, 1997, 10 pgs.

Florescu et al., "A Performance Evaluation of Alternative Mapping Schemes for Storing XML Data in a Relational Database", Internet Citation, dated May 13, 1999, 31 pages.

Oracle®, "TimesTen to TimesTen Replication Guide" Release 7.0, B31684-03, Sep. 2007, http://download.oracle.com/otn_hosted_doc/timesten/703/TimesTen-Documentation/replication.pdf.

The Times Ten Team, Mid-Tier Caching: The Times Ten Approach, Jun. 2002, ACM SIGMOD, pp. 588-593.

Oracle®, "TimesTen to TimesTen In-Memory Database Introduction" Release 7.0, B31687-03, Sep. 2007, http://download.oracle.com/otn_hosted_doc/timesten/703/TimesTen-Documentation/intro.pdf.

Oracle®, "TimesTen Connect to Oracle Guide" Release 7.0, B3I685-03, Sep. 2007, http://download.oracle.com/otn_hosted_doc/timesten/703/TimesTen.

Oracle, "Oracle Times In-Memory Database Architectural Overview" Release 6.0, dated Oct. 26, 2006 http://web.archieve.org/web/20061026030955/http://download-west-oracle.com.

Liu, U.S. Appl. No. 14/699,685, filed Apr. 29, 2015, Notice of Allowance, dated Aug. 22, 2017.

Liu U.S. Appl. No. 14/699,685, filed Apr. 29, 2015, Notice of Allowance, dated Apr. 24, 2017.

* cited by examiner

```
                          { "poNumber"    : 1600,
                            "poDate"      : 1,
                            "items"       : { "itemName": "Kids Power"
                                              "ItemPrice" : 2,
    poDocument1.json 202 {                    "parts"    :[{ "partName" : "Lethal Weapon",
                                                             "partQuantity"  : 1 },
                                                           { "partName" : "Life Saver",
                                                             "partQuantity"  : 2 }],
                                              "itemQuantity"  : 5 }}
                          { "poNumber"    : 1700,
                            "poDate"      : 2,
                            "Sparse001"   : "john_smith",
                            "Sparse002"   : "John Smith",
                            "items"       : [{ "itemName" : "Christmas Bag",
                                               "itemPrice" : "$1.10",
                                            "parts"    :[{ "partName" : "One Magic Christmas",
                                                           "partQuantity"  : 9}],
                                            "itemQuantity"  : 3 },
                                            { "itemName": "Musical Weapon"
                                              "itemPrice" : 3,
                                              "parts"    :[{ "partName" : "Lethal Weapon",
                                                             "partQuantity"  : 20 },
                                                           { "partName" : "Life Saver",
                                                             "partQuantity"  : 1 }],
                                              "itemQuantity"  : 5 }
    poDocument2.json 204 {                    "parts2"   :[{ "part2Name" : "Guitar",
                                                             "part2Quantity"  : 1,
                                                             "diffpart2Name" : "Kids Guitar"},
                                                             "part2Name" : "Drum Set",
                                                             "part2Quantity"  : 1 }]
                                            }]
                            { "add_items" : [{ "add_itemName" : "Bow and Arrow",
                                               "add_itemPrice" : 2,
                                               "add_parts"   :[{ "add_partName" : "Bow",
                                                                 "add_partQuantity"  : 1},
                                                               { "add_partName" : "Arrow",
                                                                 "add_partQuantity"  : 1 }],
                                               "add_itemQuantity"  : 1}]}
```

FIG. 2 data guide 154

| PID | PATH | DATATYPE | MIN | MAX |
|---|---|---|---|---|
| 1 | $ | {} | | |
| 2 | $.poNumber | Number | 1600 | 1600 |
| 3 | $.poDate | Number | 1 | 1 |
| 6 | $.items | {} | | |
| 7 | $.items.itemName | String | 10 | 10 |
| 8 | $.items.itemPrice | Number | 2 | 2 |
| 9 | $.items.itemQuantity | Number | 3 | 5 |
| 10 | $.items.parts | [] | | |
| 11 | $.items.parts.partName | String | 10 | 22 |
| 12 | $.items.parts.partQuantity | Number | 1 | 2 |

FIG. 3 data guide 154

| PID | PATH | DATATYPE | MIN | MAX |
|---|---|---|---|---|
| 1 | $ | {} | | |
| 2 | $.poNumber | Number | 1600 | 1700 |
| 3 | $.poDate | Number | 1 | 2 |
| 4 | $.Sparse001 | String | 10 | 16 |
| 5 | $.Sparse002 | String | 10 | 11 |
| 6 | $.items | [] | | |
| 7 | $.items.itemName | String | 10 | 13 |
| 8 | $.items.itemPrice | String | 1 | 5 |
| 9 | $.items.itemQuantity | Number | 3 | 5 |
| 10 | $.items.parts | [] | | |
| 11 | $.items.parts.partName | String | 10 | 22 |
| 12 | $.items.parts.partQuantity | Number | 1 | 9 |
| 13 | $.items.parts2 | [] | | |
| 14 | $.items.parts2.part2Name | String | 6 | 11 |
| 15 | $.items.parts2.part2Quantity | Number | 1 | 20 |
| 16 | $.items.parts2.diffpart2Name | String | 11 | 11 |
| 17 | $ | {} | | |
| 18 | $.add_items | [] | | |
| 19 | $.add_items.add_itemName | String | 13 | 13 |
| 20 | $.add_items.add_itemPrice | Number | 2 | 2 |
| 21 | $.add_items.add_itemQuantity | Number | 1 | 1 |
| 22 | $.add_items.add_parts | [] | | |
| 23 | $.add_items.add_parts.add_partName | String | 3 | 5 |
| 24 | $.add_items.add_parts.add_partQuantity | Number | 1 | 1 |

FIG. 4

```sql
CREATE OR REPLACE VIEW JSON_COLLECTION_MD_JTAB
AS
select oc.rowid,
       v.*
from JSON_COLLECTION oc, -- original json collection table
  JSON_TABLE(oc.document FORMAT json, '$'
     COLUMNS
     (
       poNum varchar2(10) PATH '$.poNum',
       poDate varchar2(12) PATH '$.poDate',
       sparse001 varchar2(20) PATH '$.sparse001',
       sparse002 varchar2(20) PATH '$.sparse002'
       NESTED PATH '$.items[*]'
       COLUMNS
       (
       item_seq for ordinality,
       itemName varchar2(10) PATH '$.itemName',
       itemPrice varchar2(10) PATH '$.itemPrice',
       itemQuantity varchar2(10) PATH '$.itemQuanitty',
         NESTED PATH '$.parts[*]'
         COLUMNS
         (
           parts_seq for ordinality,
           partName varchar2(10) PATH '$.partName',
           partQuantity varchar2(10) PATH '$.partQuantity'
         )
         NESTED PATH '$.parts2[*]'
         COLUMNS
         (
           parts2_seq for ordinality,
           part2Name varchar2(10) PATH '$.part2Name',
           part2Quantity varchar2(10) PATH '$.part2Quantity',
           diffPart2Name varchar2(10) PATH '$.diffPart2Name'
         )
       ),
       NESTED PATH '$.add_items[*]'
       COLUMNS
       (
       add_item_seq for ordinality,
       add_itemName varchar2(10) PATH '$.add_itemName',
       add_itemPrice varchar2(10) PATH '$.add_itemPrice',
       add_itemQuantity varchar2(10) PATH '$.add_itemQuanitty',
         NESTED PATH '$.add_parts[*]'
         COLUMNS
         (
           add_parts_seq for ordinality,
           add_partName varchar2(10) PATH '$.add_partName',
           add_partQuantity varchar2(10) PATH '$.add_partQuantity',
           add_partQuantity_number   number   PATH '$.add_partQuantity'
         )
       )
     ) v
```

FIG. 8

```
CREATE OR REPLACE VIEW JSON_COLLECTION_MD_JTAB
AS
select oc.rowid,
       v.*
from JSON_COLLECTION oc, -- original json collection table
   JSON_TABLE(oc.document FORMAT json, '$.add_items'
      COLUMNS
      (
        add_item_seq for ordinality,
        add_itemName varchar2(10) PATH '$.add_itemName',
        add_itemPrice varchar2(10) PATH '$.add_itemPrice',
        add_itemQuantity varchar2(10) PATH '$.add_itemQuanitty',
        NESTED PATH '$.add_parts[*]'
         COLUMNS
         (
          add_parts_seq for ordinality,
          add_partName varchar2(10) PATH '$.add_partName',
          add_partQuantity varchar2(10) PATH '$.add_partQuantity',
          add_partQuantity_number    number    PATH '$.add_partQuantity'
         )
       )
) v
```

FIG. 9

```
CREATE OR REPLACE VIEW JSON_COLLECTION_MD_JTAB
AS
select oc.rowid,
       v.*
from JSON_COLLECTION oc, -- original json collection table
  JSON_TABLE(oc.document FORMAT json, '$'
      COLUMNS
      (
        poNum varchar2(10) PATH '$.poNum',
        poDate varchar2(12) PATH '$.poDate',
        sparse001 varchar2(20) PATH '$.sparse001',
        sparse002 varchar2(20) PATH '$.sparse002'
        NESTED PATH '$.items[*]'
        COLUMNS
        (
        item_seq for ordinality,
        itemName varchar2(10) PATH '$.itemName',
        itemPrice varchar2(10) PATH '$.itemPrice',
        itemQuantity varchar2(10) PATH '$.itemQuanitty',
        parts varchar2(4000) PATH '$.parts[*]'
        ),
        NESTED PATH '$.parts2[*]'
          COLUMNS
          (
            parts2_seq for ordinality,
            part2Name varchar2(10) PATH '$.part2Name',
            part2Quantity varchar2(10) PATH '$.part2Quantity',
            diffPart2Name varchar2(10) PATH '$.diffPart2Name'
          )
        ),
        NESTED PATH '$.add_items[*]'
        COLUMNS
        (
        add_item_seq for ordinality,
        add_itemName varchar2(10) PATH '$.add_itemName',
        add_itemPrice varchar2(10) PATH '$.add_itemPrice',
        add_itemQuantity varchar2(10) PATH '$.add_itemQuanitty',
          NESTED PATH '$.add_parts[*]'
          COLUMNS
          (
            add_parts_seq for ordinality,
            add_partName varchar2(10) PATH '$.add_partName',
            add_partQuantity varchar2(10) PATH '$.add_partQuantity',
            add_partQuantity_number  number  PATH '$.add_partQuantity'
          )
        )
      )
  ) v
```

| rowid | poNum | poDate | sparse001 | sparse002 | item_seq | itemName | itemPrice | itemQuantity | parts_seq |
|---|---|---|---|---|---|---|---|---|---|
| 0 | 1600 | 1 | NULL | NULL | 0 | Kids Power | 2 | 5 | 0 |
| 1 | 1600 | 1 | NULL | NULL | 0 | Kids Power | 2 | 5 | 1 |
| 2 | 1700 | 2 | john_smith | John Smith | 0 | Christmas Bag | $1.10 | 3 | 0 |
| 3 | 1700 | 2 | john_smith | John Smith | 1 | Musical Weapon | 3 | 5 | 0 |
| 4 | 1700 | 2 | john_smith | John Smith | 1 | Musical Weapon | 3 | 5 | 1 |
| 5 | 1700 | 2 | john_smith | John Smith | 1 | Musical Weapon | 3 | 5 | NULL |
| 6 | 1700 | 2 | john_smith | John Smith | NULL | NULL | 3 | 5 | NULL |
| 7 | NULL | NULL | NULL | NULL | NULL | NULL | NULL | NULL | NULL |
| 8 | NULL | NULL | NULL | NULL | NULL | NULL | NULL | NULL | NULL |

FIG. 11B

| partName | partQuantity | parts2_seq | part2Name | part2Quantity | diffPart2Name | add_item_seq | add_itemName |
|---|---|---|---|---|---|---|---|
| Lethal Weapon | 1 | NULL | NULL | NULL | NULL | NULL | NULL |
| Life Saver | 2 | NULL | NULL | NULL | NULL | NULL | NULL |
| One Magic Chrismas | 9 | NULL | NULL | NULL | NULL | NULL | NULL |
| Lethal Weapon | 20 | NULL | NULL | NULL | NULL | NULL | NULL |
| Life Saver | 1 | NULL | NULL | NULL | NULL | NULL | NULL |
| NULL | NULL | 0 | Guitar | NULL | Kids Guitar | NULL | NULL |
| NULL | NULL | 1 | Drum Set | 1 | NULL | NULL | NULL |
| NULL | NULL | NULL | NULL | NULL | NULL | 0 | Bow and Arrow |
| NULL | NULL | NULL | NULL | NULL | NULL | 0 | Bow and Arrow |

| add_itemPrice | add_itemQuantity | add_parts_seq | add_partName | add_partQuantity | add_partQuantity_number |
|---|---|---|---|---|---|
| NULL | NULL | NULL | NULL | NULL | NULL |
| NULL | NULL | NULL | NULL | NULL | NULL |
| NULL | NULL | NULL | NULL | NULL | NULL |
| NULL | NULL | NULL | NULL | NULL | NULL |
| NULL | NULL | NULL | NULL | NULL | NULL |
| NULL | NULL | NULL | NULL | NULL | NULL |
| 2 | 1 | 0 | Bow | 1 | NULL |
| 2 | 1 | 1 | Arrow | 1 | NULL |

COLUMNAR DATA ARRANGEMENT FOR SEMI-STRUCTURED DATA

BENEFIT CLAIM

This application claims the benefit under 35 USC § 119(e) of provisional applications 62/245,890, filed Oct. 23, 2015, the entire contents of which are hereby incorporated by reference for all purposes as if fully set forth herein. The applicant(s) hereby rescind any disclaimer of claim scope in the provisional applications and advise the USPTO that the claims in this application may be broader than any claim in the provisional applications.

FIELD OF THE INVENTION

The present invention relates to database systems and, more specifically, to evaluating queries for semi-structured data in database systems.

BACKGROUND

Semi-structured data format, such as JSON and XML, is extensively used for storage of large volume data sets, particularly because the semi-structured data can be conveniently stored in one or more documents without losing the hierarchical information of the data. The hierarchical information of the data may include information relationships and arrangement of portions of data in reference to each other. For example, semi-structured data can be generally represented as a hierarchy of nodes, each node containing a portion of the data. In such a hierarchy, each node containing a portion of semi-structured data has hierarchical relationship with one or more other nodes in the hierarchy: the node may be a parent, a sibling or a child of another node in the semi-structured data.

Despite the convenience of storing large data sets of semi-structured data in large amount of documents, querying such large amounts of documents is challenging. In particular, a query may request data that matches query defined value constraints and is located in a particular level/branch/node of the hierarchy. To satisfy the query, each document matching the query criteria needs to be navigated according to the hierarchy to match for the data requested. Such operations may be very expensive, especially considering that thousands, if not hundreds of thousands, of documents may need to be traversed. The traversals of hierarchies are particularly costly operations, if the schemas of the hierarchies involved are unknown. To query unknown or "implicit" schema data, assumptions about the hierarchy of the semi-structured data must be made, and the resulting returned data is only correct, if the semi-structured data indeed conformed to the assumed hierarchy.

One solution is to normalize semi-structured data and store the data in relational tables of a relational database to leverage the powerful query capabilities of a database management system (DBMS). However, even when data is stored in a relational manner, the query performance is not optimal. For data sets that have one to many cardinality relationships, the data sets of semi-structured data are stored separately in a relational database to avoid repetition. For example, for customer data that contains addresses and telephone numbers of customers in addition to names, each customer name may correspond to multiple addresses as well as to multiple telephone numbers. Thus, if all the customer data was to be stored in a single table of a relational database in a DBMS, to preserve the relationship between customer names and addresses and telephone numbers, each customer name would be repeated for each address and then repeated again for each telephone number. Storing addresses and phone numbers in separate tables, with foreign key relationships to customer names in a separate table, avoids the repetition of the customer names. The term "normalization/normalizing" refers to the process of splitting data into data sets according to cardinality relationships and datatypes of the datasets.

While storage efficiency is improved by normalization of semi-structured data by avoiding repetition, query performance, yet improved compared to document storage, may still be disparaging. Queries that require data from multiple datasets need to join the datasets according to their respective relationships. For example, if a query is directed to select customer names along with addresses and phone numbers, then the query execution includes joining the customer name table with the customer address table and with the customer phone number table to produce the resulting data set. Such join operations may consume substantial resources especially when often executed and when the data set is large.

One solution is to produce a de-normalized "view" of data that is physically stored in a normalized manner. Instead of storing another copy of data in a de-normalized manner, the DBMS stores the pre-computed query that produces the de-normalized view. When a user query is received that references the view, the stored pre-computed query for the view is executed to produce the resulting data set for the view. Although the stored query is pre-computed, the DBMS still has to retrieve the data from the physical storage and arrange it together for the resulting data set. Therefore, even querying a view consumes more compute resources than a retrieval of data from a single table in a database.

BRIEF DESCRIPTION OF THE DRAWINGS

In the drawings:

FIG. 2 depicts an example of semi-structured data document collection that contains sample JSON data depicted, according to an embodiment;

FIG. 3 is a block diagram of a data guide of a semi-structured data partition, according to an embodiment;

FIG. 4 is a block diagram of a data guide of a semi-structured data document collection, according to an embodiment;

FIG. 8-10 depict examples of denormalized arrangement using JSON_TABLE operators, according to embodiments;

FIG. 11A-B depict an example of a virtual table, according to an embodiment.

DETAILED DESCRIPTION

Figure 1A:
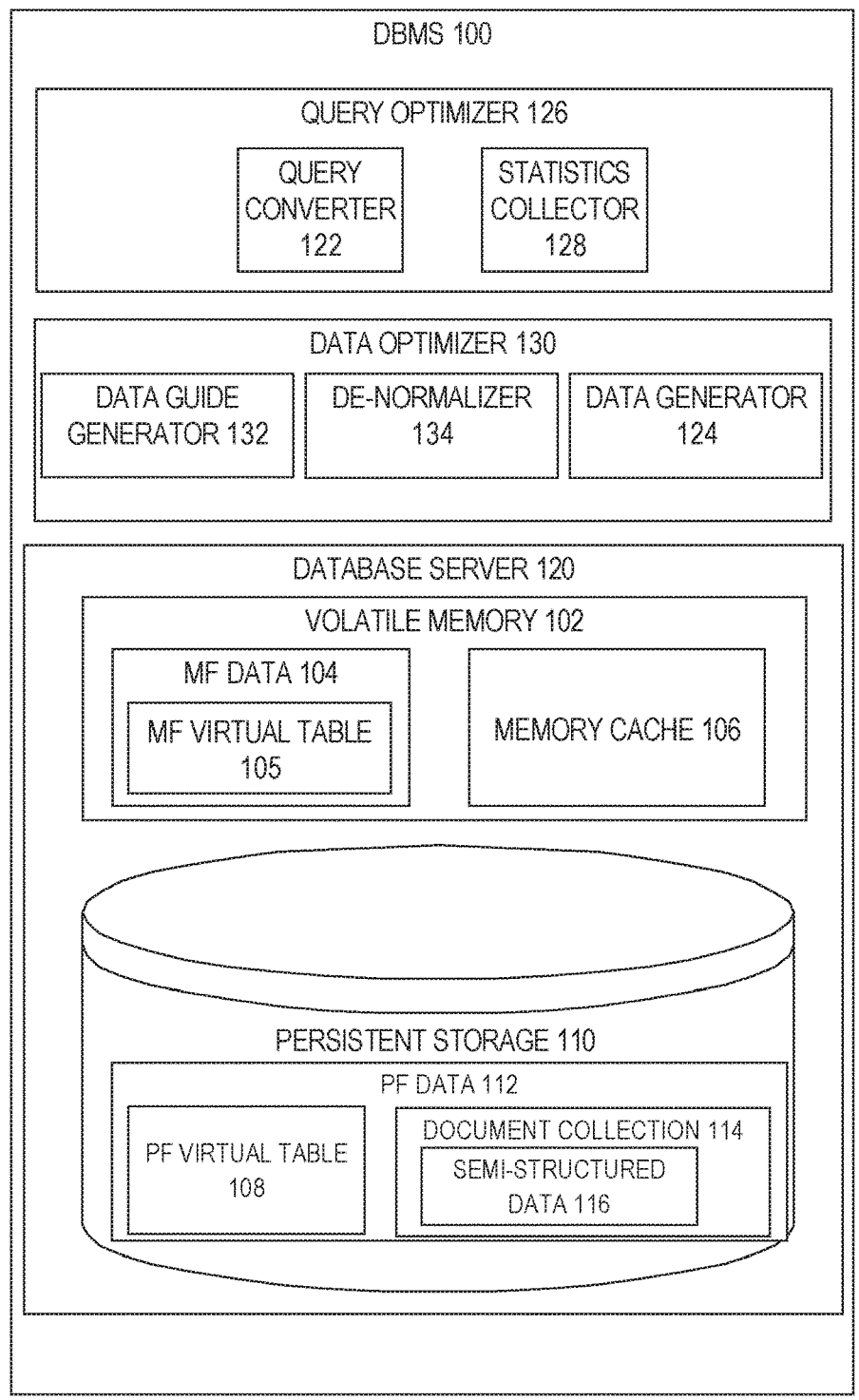
FIG. 1A is a block diagram of a database management system (DBMS) that concurrently maintains mirror format virtual table in volatile memory and persistent format virtual table in persistent storage, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described to generate a denormalized data arrangement of various detail for a collection of documents containing semi-structured data. The term "denormalized data arrangement" (or simply "denormalized arrangement") refers to an arrangement of data that maps semi-structured data's hierarchical form to a flat relational scheme of a selected detail level. A denormalized data arrangement may be generated for any collection of documents of semi-structured data, whether the semi-structured data in the documents of the collection have related or unrelated structures. A denormalized data arrangement "flattens" the hierarchical form of semi-structured data to a set of columns, in an embodiment. The generated columns preserve the original row-cardinality, i.e. each value in a row of a column relates to a value of another column in the same row, and if not, a NULL value is inserted for the row of the other column.

Such a denormalized data arrangement substantially speeds up querying of the semi-structured data. A received query does not have to traverse the hierarchy of the semi-structured data but rather extracts data from the columns using query predicates and other scan or join based querying techniques.

In one embodiment, column data types and row value formats of a denormalized data arrangement are determined from explicit schemas of documents of semi-structured data. In another embodiment, the data arrangement is determined by first generating an implicit schema for the semi-structured data. Both the implicit and explicit schemas are referred herein as a "data guide." Techniques to generate a data guide from semi-structured data are described in "Dynamically Updating Data Guide For Hierarchical Data Objects," U.S. patent application Ser. No. 14/699,685, filed on Apr. 29, 2015, referred herein as "Data Guide Application," the content of which is incorporated herein.

In some embodiments, a portion of semi-structured data in a collection, rather than the whole collection, is represented according to a denormalized arrangement. The term "semi-structured data partition" refers to such a portion of semi-structured data. The size of the semi-structured data partition is either pre-determined or could be derived from a query received for the collection.

To speed up the evaluation of queries received for semi-structured data, path expressions in the queries that specify a traversal of the hierarchy are converted into relational statements, in an embodiment. Since the hierarchical semi-structured data is flattened, queries with path expressions cannot be readily executed on the flattened semi-structured data. Accordingly, the received queries are converted into relational queries to be executed on the flattened data and yield the same output as the path expressions in the original query.

Additionally, the path expressions in the received queries for a collection of semi-structured data documents may determine the detail level selected from semi-structured data for a denormalized arrangement. The detail level selected for a denormalized data arrangement of semi-structured data depends on the amount of hierarchical information necessary to evaluate path expressions: for example, the number of parent child hierarchical relationships or the order of siblings at a particular level of the hierarchy. Such information may be used to generate a more compact form of denormalized arrangement of the semi-structured data for relational query execution.

In an embodiment, the denormalized data arrangement of semi-structured data in a DBMS is represented by a relational statement. For example, a "SELECT" clause may be used with a JSON_TABLE operator for JSON type semi-structured data or with an XMLTable operator for XML type semi-structured data. Using these semi-structured data operators, semi-structured data is arranged in a set of columns with types and value formats determined based on a data guide.

The data resulting from the execution of the relational statement representing the denormalized arrangement of semi-structured data is stored in a memory, in an embodiment. The resultant stored data is referred herein as a "virtual table" with columns corresponding to the set of columns of the denormalized arrangement of semi-structured data. Virtual tables may be stored in persistent or volatile memory. The techniques to store data in virtual tables are further described in "Mirroring, In Memory, Data From Disk To Improve Query Performance," U.S. patent application Ser. No. 14/337,179, filed on Jul. 21, 2014, referred herein as "Mirroring Data Application", the entire content of which is incorporated herein by this reference.

General Architecture

FIG. 1A is a block diagram of a database management system which is used to implement techniques described herein, according to one embodiment. Referring to FIG. 1, database management system (DBMS) 100 includes volatile memory 102 and persistent storage 110 that stores data that is managed by data optimizer 130 and on which queries processed by query optimizer 126 are executed.

Volatile memory 102 generally represents the random access memory used by DBMS 100, and may be implemented by any number of memory devices. Typically, data stored in volatile memory 102 is lost when a failure occurs.

Persistent storage 110 generally represents any number of persistent storage devices, such as magnetic disks, FLASH memory, and/or solid state drives. Unlike volatile memory 102, data stored in persistent storage 110 is not lost when a failure occurs. Consequently, after a failure, the data in persistent storage 110 may be used to rebuild the data that was lost in volatile memory 102.

The format that corresponds to the on-disk format of semi-structured data is referred to herein as the "persistent format" or "PF". Data that is in the persistent format is referred to herein as PF data. An in-memory format that is independent of the on-disk format is referred to as a "mirror format" or "MF". Data that is in the mirror format is referred to herein as MF data.

PF data 112 resides on persistent storage device 110 in one or more persistent formats. PF data 112 may be stored on persistent storage device 110 as document collection 114 of semi-structured data 116. Each document may be stored as a flat file on a contiguous memory address space. Additionally or alternatively, PF data 112 may be stored on persistent storage device 110 in the form of virtual tables such as PF virtual table 108. PF virtual table 108 may be the structure of PF data 112 on any level of organization, for example, a table, columns, rows, row-major disk blocks, column-major disk blocks etc. In an embodiment, according to techniques described below, data optimizer 130 generates from semi-structured data 116 of document collection 114 a virtual table and stores the virtual table in PF data 112 as PF virtual table 108.

The volatile memory 102 further includes memory cache 106 for a cache of PF data. Within cache 106, the data is stored in a format that is based on the format in which the data resides within the PF data 112. For example, if the persistent format is row-major disk blocks, then cache 106 may contain cached copies of row-major disk blocks.

On the other hand, MF data 104 is in a format that is unrelated to the persistent format. For example, in the case where the persistent format is row-major uncompressed disk blocks, the mirror format may be column-major compression units. Because the mirror format differs from the persistent format, MF data 104 is produced by performing transformations on PF data 112 according to techniques described in the Mirroring Data Application.

Data generator 124 may perform these transformations, which may occur both when volatile memory 102 is initially populated with MF data 104 (whether at start-up or on-demand), and when volatile memory 102 is re-populated with MF data 104 after a failure. In an embodiment, data generator 124 may select data from PF data 112 and mirror the data to generate MF data 104 based on one or more factors described in "Selective Data Compression For In-Memory Databases," U.S. patent application Ser. No. 14/841,561, filed on Aug. 31, 2015, referred herein as "Selective Mirroring Application", the entire content of which is incorporated herein by this reference.

Database server 120 maintains in-memory MF data 104 transactionally consistent with PF data 112, in an embodiment. MF data 104 is transactionally consistent in that any data items provided to a transaction from MF data 104 will be the same version that would have been provided if the data items were provided from PF data 112.

Significantly, the existence of MF data 104 may be transparent to the database applications that submit database commands to the database server that makes use of MF data 104. For example, those same applications, designed to interact with DBMSs that operate exclusively on PF data 112, may interact without modification with a database server that maintains MF data 104 in addition to PF data 112. Further, transparent to those applications, that database server may use MF data 104 to more efficiently process some or all of those database commands. Further details on a DBMS that utilizes MF data and PF data are described in the Mirroring Data Application.

Functional Overview

Figure 1B:
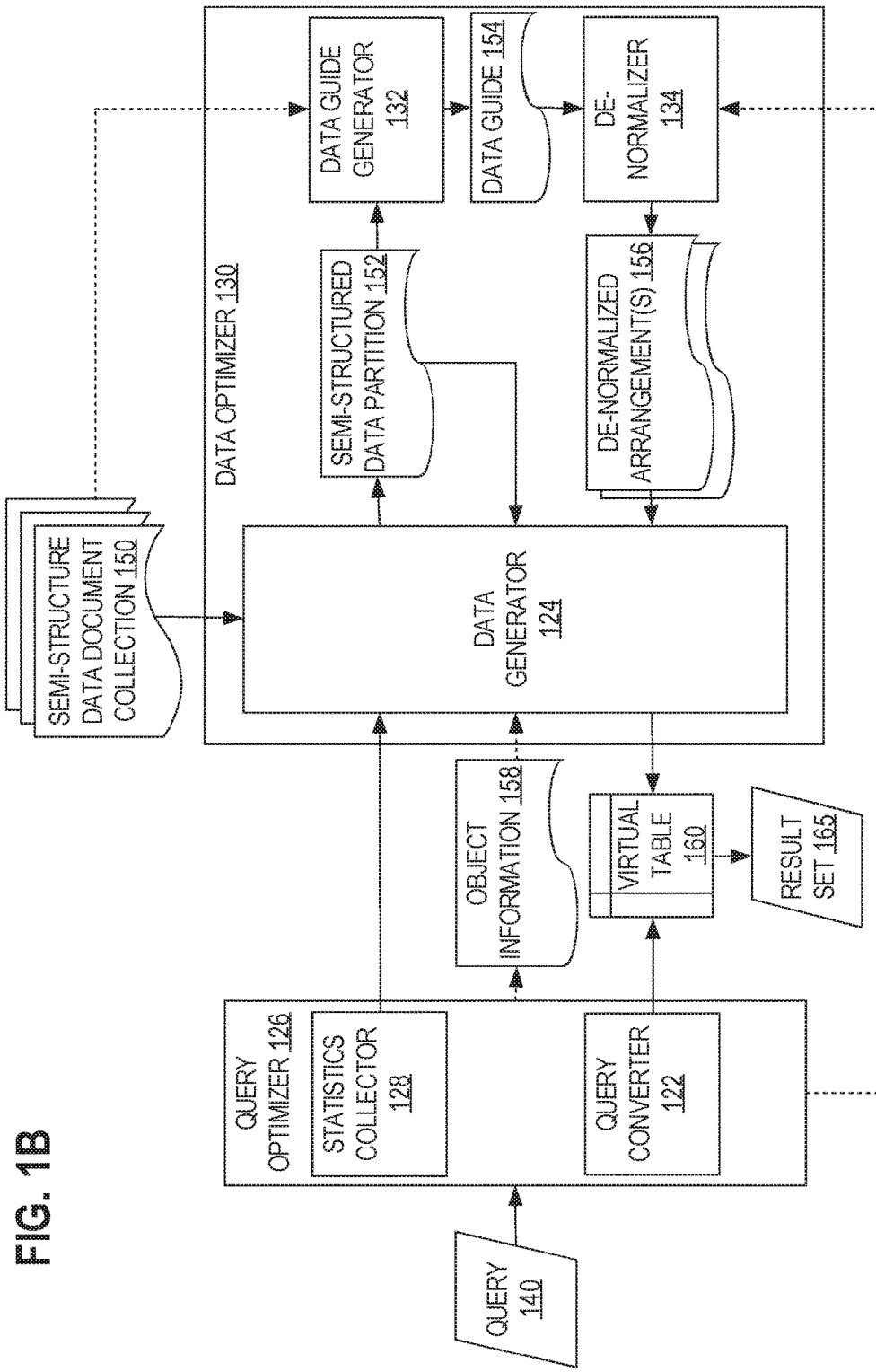
FIG. 1B is a process diagram that depicts program logic for processing a query against semi-structured data document collection and generating a virtual table for the queried semi-structured data, according to an embodiment.

DBMS 100 may receive queries for semi-structured data from one or more database applications (not shown) for execution on database server 120. FIG. 1B is a process diagram that depicts program logic for processing query 140 against semi-structured data document collection 150 and generating result set 165 based on virtual table 160 for the queried semi-structured data, in an embodiment.

To execute a query, such as query 140, DBMS 100, using query optimizer 126, may first convert query 140 into an ordered set of operators used to access data from PF data 112 or MF data 104 in databases server 120. Each operator may contain one or more data operations on an output data of another operator or on PF data 112 or MF data 104. Query optimizer 126 may generate a permutation of sets of operators. To ensure that the most optimal set of operators is selected, a statistics collector 128 of query optimizer 126 collects and maintains statistics about DBMS 100, in an embodiment. The various types of statistics collected by statistics collector 128, are further discussed in the Selective Mirroring Application.

Generating Semi-Structured Data Partitions and Data Guides

The statistics of statistics collector 128 may also assist in decreasing the amount of data that needs to be processed for evaluating query 140. To accurately determine result set 165, the full data set referenced in query 140 would need to be processed. In an embodiment, virtual table 160 is generated from semi-structured data document collection 150 in its entirety (as shown by a dotted arrow line from semi-structured data document collection 150 to data guide generator 132 in FIG. 1B).

In another embodiment, statistics of statistics collector 128 serves as an input to data generator 124 to determine the most queried portion of semi-structured data document collection 150. The most queried portion of semi-structured data, semi-structured data partition 152, has less data than semi-structured data document collection 150, while at the same time, semi-structured data partition 152 is highly likely to contain all data necessary for determining result set 165 for query 140. In a related embodiment, the amount of semi-structured data selected for semi-structured data partition 152 further depends on in-memory compression units (IMCUs) allocated in MF data 104 for virtual table 160. The semi-structured data partition 152 size is determined from the compression level used for IMCUs and the number of IMCUs allocated for virtual table 160.

In another alternative embodiment, a query optimizer may pre-process received query 140 to extract information on hierarchical objects that are queried (referred to in FIG. 1B as object information 158). Data generator 124 selects the semi-structured data based on object information 158 for generating semi-structured data partition 152, which contains at least the semi-structured data objects necessary for evaluating query 140.

To de-normalize semi-structured data for faster query processing, descriptions of the hierarchical nodes of the semi-structured data may be extracted from either semi-structured data 152 or semi-structured data document collection 150, referred herein as "input semi-structured data." Data guide generator 132 generates data guide 154 that describes the input semi-structured data according to techniques described in Data Guide Application, in an embodiment. Data guide 154 describes constraints on hierarchical nodes based on data guide generator 132 traversing through semi-structured data and recording constraints for each hierarchical node. The constraints may include whether the selected node is a scalar property (non-complex data type) or an object (of complex data type), whether the node is a singleton or an array, the datatype and range or length of scalar property values.

Depending on the input semi-structured data in one or more embodiments, generated data guide 154 may be different. Semi-structured data document collection 150 may have a different data guide from semi-structured data partition 152's data guide even though semi-structured data partition 152 is a portion of semi-structured data document collection 150, in an embodiment. For example for JSON semi-structured data collections, if data guide generator 132 has encountered only a single instance of a particular object in the input semi-structured data, then data guide 154 may describe the particular object as a singleton, while if data guide generator 132 has encountered multiple instances of the particular object, the data guide 154 may describe the particular object as an array. Similarly, if in semi-structured data partition 152, the values of a particular scalar property are integers, then the data guide 154 may describe the particular scalar property as a number, while if semi-structured data document collection 150 contains an additional value of the particular scalar property that has at least one non-numeric character, then data guide 154 may describe the particular scalar property as a string.

To illustrate the query processing and generation of a virtual table, an example of semi-structured data document collection 150 contains sample JSON data depicted in FIG. 2. In one example, semi-structured data partition 152 is generated when statistics collector 128 determines that "add_items" object is the most queried based on query statistics for semi-structured data document collection 150. Thus, in such an example, data generator 124 may select instances of "add_items" object for semi-structured data partition 152. However, if "add_items" object is the least queried in another example, then instances of "add_items" object are excluded from semi-structured data partition 152.

In another example, statistics collector 128 may indicate that poDocument1.json 202 is queried significantly more than other documents in semi-structured data document collections 150. In response, data generator 124 may select poDocument1.json 202 as semi-structured data partition 152 and provide semi-structured data in poDocument1.json 202 to data guide generator 132. In such an example, Data guide generator 132 may traverse through the semi-structured data to generate data guide 154. FIG. 3 depicts resulting data guide 154 of poDocument1.json 202 for semi-structured data 152.

In yet another example, data guide generator may generate data guide 154 based on semi-structured data document collection 152 in its entirety as depicted in FIG. 4. Since the collection has more objects in general, data guide 154 for the collection may be different from data guide 154 for semi-structured data partition 152 of the previous example. Even for the same object, the data guides may contain different constraints.

FIG. 4 depicts a data guide generated from the document collection depicted in FIG. 2. Since the collection has a greater number of objects than the partition in the previous example, a greater number of objects are depicted in FIG. 4 than in FIG. 3. Furthermore, since data generator 132 has encountered "items" as an array of objects in poDocument2.json 204, the "items" object is an array in FIG. 4 rather than a singleton as in FIG. 3. The "items" object in the data guide for the collection further differs from the same "items" object for semi-structured data partition 152 by having scalar property "items[ ].itemPrice" as a string rather than as a number because poDocument2.json 204 contains an "itemPrice" scalar property with a value of "$1.10", which is not a number.

Figure 5:
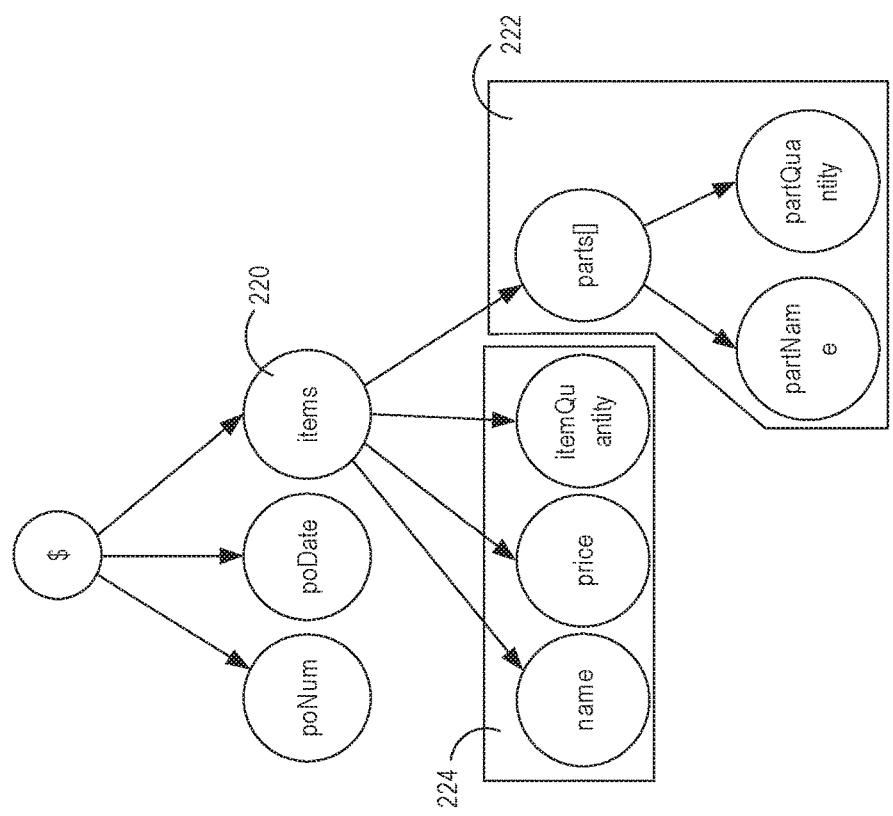
FIG. 5 is a block diagram of a semi-structured data partition in a hierarchical arrangement, according to an embodiment.
Figure 6:
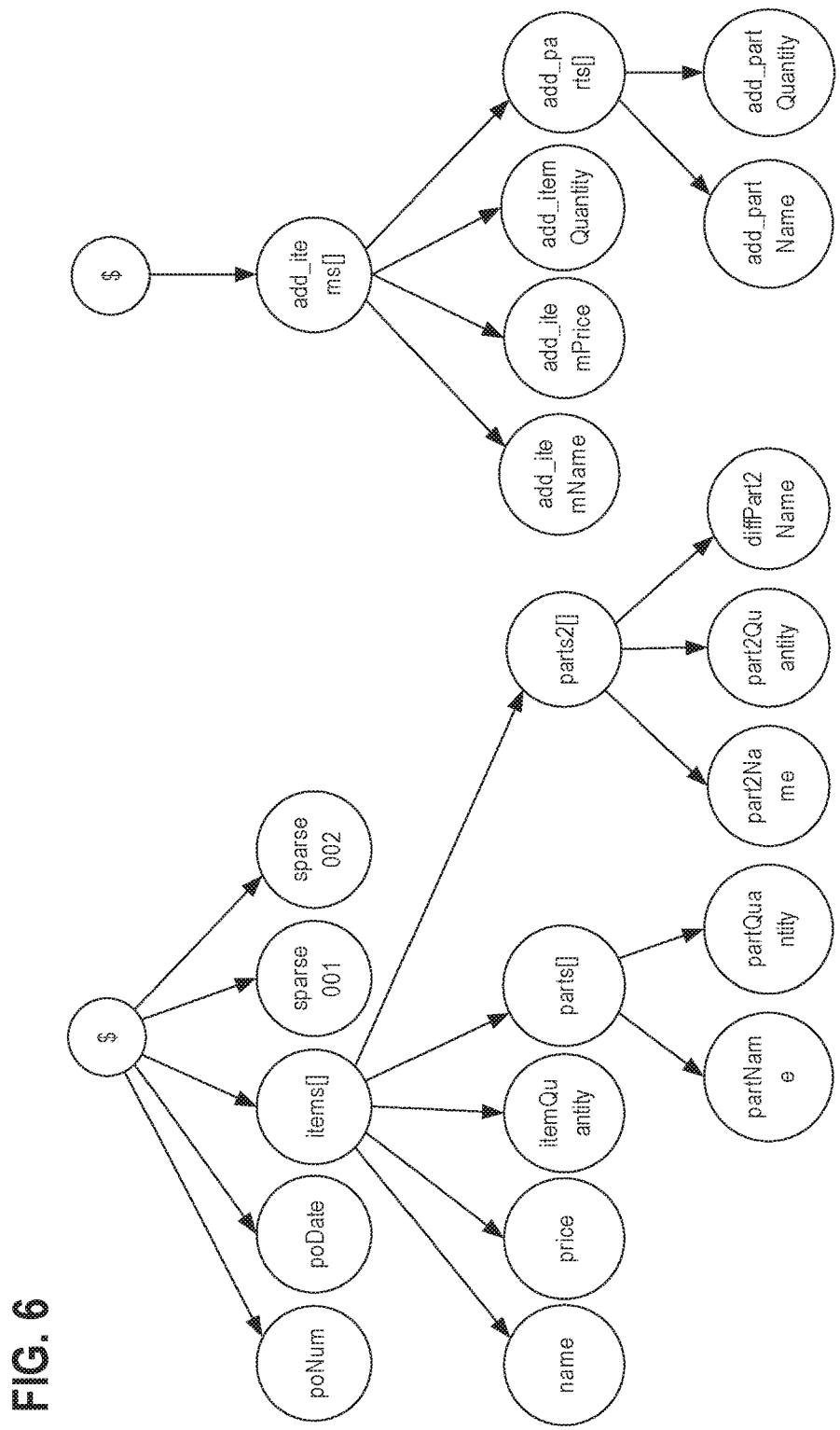
FIG. 6 is a block diagram of a semi-structured document collection in a hierarchical arrangement, according to an embodiment.

A hierarchical representation of data guide 154 may be used to illustrate relational relationships such as master-detail relationship between nodes in the hierarchy of data guide 154. For example, FIG. 5 depicts hierarchical information of semi-structured data partition 152 according to data guide 154 of FIG. 3. Nodes 224 and nodes 222 are descendant nodes of parent node 220. Particularly, each element in the "parts" array of subtree of nodes 222 describes a further detail of "items" node 220. Similarly, FIG. 6 depicts a hierarchy of the fully expanded relational relationships of the document collection depicted in FIG. 2 according to data guide 154 depicted in FIG. 4. Such relational relationships of semi-structured data as described by the data guide of the semi-structured data may be used to transform the semi-structured data into a virtual table with a denormalized arrangement, in an embodiment.

Denormalizing Semi-Structured Data

In an embodiment, denormalizer 134 generates denormalized arrangement 156 based on data guide 154. Denormalized arrangement 156 encodes hierarchical information of the input semi-structured data as well as object information of the input semi-structured data in the form of a relational statement. Executing the relational statement on the input semi-structured data results in the generation of virtual table 160. Querying virtual table 160, in its turn, produces result set 165 for query 140 received for the input semi-structured data.

Figure 7:
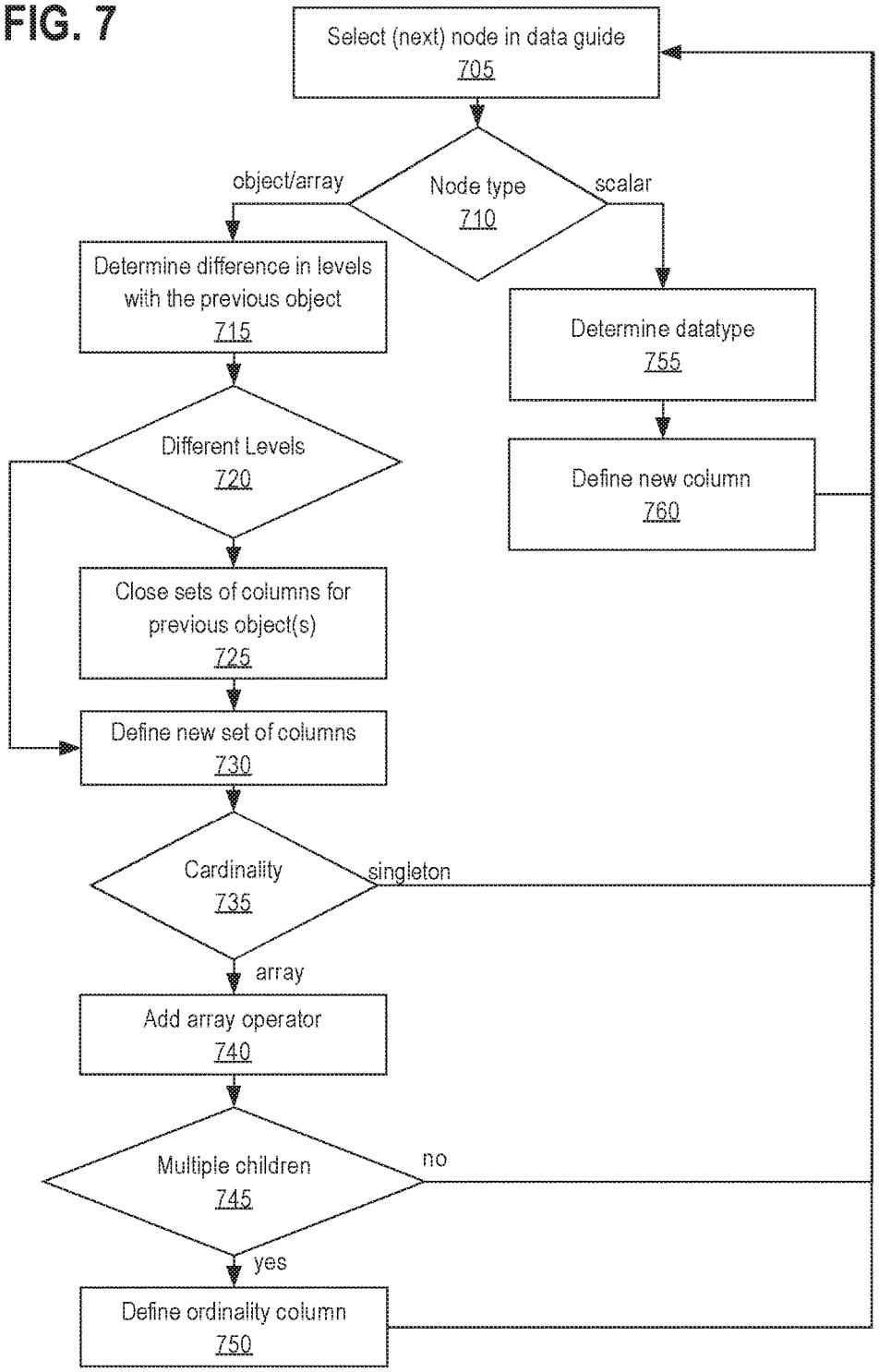
FIG. 7 is a block diagram that illustrates a process for generating for a denormalized arrangement based on a data guide of semi-structured data, in accordance with one or more embodiments.

FIG. 7 is a block diagram that depicts a process for generating sets of columns for a denormalized data arrangement based on a data guide, in an embodiment. One or more of the blocks described may be omitted, repeated, and/or performed in a different order. Accordingly, the specific arrangement of blocks shown in FIG. 7 should not be construed as limiting the scope of the invention. Further, the blocks described below may be modified based on different arrangements of columns in a denormalized arrangement of semi-structured data. One such arrangement, for example, may use a single set of columns in the denormalized arrangement for array/object/scalar property nodes of the semi-structured data rather than multiple sets of columns.

At block 705, the root node is initially selected from data guide 154 of the input semi-structured data. At each subsequent iteration, the next node in data guide 154 is selected at block 705 until all nodes in data guide 154 are traversed. The nodes are iterated based on their path from the root node to each of the leaf nodes in the hierarchy. For example, data guide 154 depicted in FIG. 4 is already arranged in rows based on the path ordering (denoted in "PID" column), thus iterating through rows of data guide 154 of FIG. 4 from the first row to the last row will result in a full traversal of the hierarchy from the root node to each of the leaf nodes.

In an embodiment, for each new object or array in semi-structured data a separate set of column(s) is defined for denormalized arrangement 156. At block 710, to determine whether to start or end a definition of a set of columns, the datatype of the selected node is retrieved from data guide 154 and processed to determine the node datatype. If the datatype describes a non-complex, non-array data type such as string, integer, real number or date, then the selected node is considered to be a scalar property, otherwise the selected node triggers definition of a new set of columns at blocks 715-750.

Before defining a new set of columns for the denormalized arrangement, in some embodiments, the selection of a new object/array node at block 705 may also trigger the end of the definition(s) for set(s) of columns defined for previously selected node(s). If the selected object/array node is at a higher level in the hierarchy than the previously selected node, then there are no more nodes in the path of the previously selected node and the definitions for set(s) of columns for one or more of the previously selected nodes are ended for denormalized arrangement 156. At block 715, the difference in number of levels between the level of the currently selected node and the previously selected node is determined. This number of levels of the difference corresponds to the number of previous sets of columns for which definitions need to be ended. At block 720, if there is a difference, then the sets of column definition(s) for the determined level of previously selected nodes are closed in denormalized arrangement 156 at block 725.

For example, the process may select the node corresponding to "PID" with the value of 13 of data guide 154 in FIG. 4. As depicted by the "[ ]" symbol, "$.items.parts2" node is an array. The previous node at "PID", with the value of 12, has a path of "$.items.parts.partQuantity", which is below the "$.items.part2" node by a single level. Accordingly, the definitions for one set of columns ("$items.parts") is closed in denormalized arrangement 156 before starting the definition for the "$.items.parts2" set of columns.

At block 730, a new definition is generated for a new set of columns for the selected object/array node. If at block 735, it is determined that the selected node is an array, then an array operator is added to the definition of the set of columns at block 740. The array operator denotes that for each value in the columns of the new set, values in the columns of the parent node(s) are to be repeated. Stated differently, since the selected node is an array, the node has many-to-one relationship with the antecedent nodes; thus, for the denormalized arrangement to represent this relationship, the values in the antecedent nodes are repeated for each value in the array of the selected node. Similarly, the selected array node has a many-to-one relationship with any node with which the parent node has a one-to-one relationship. For example, the respective values of each of the singleton sibling nodes, which have a one-to-one relationship with the parent node, are to be duplicated for each value of the array of the selected node when denormalized. While sibling array nodes, which has a many-to-one relationship with the parent node, have accordingly a many-to-many relationship with the selected node. In such a case, since hierarchical form lacks specific information on particular value relationships within many-to-many relationships, values of the array of the selected node have no correspondence and/or relationship with the values of the array of the sibling node when denormalized.

At block 745, the number of child nodes is determined for the selected array node. If more than a single child node exists, then those multiple child node values have one-to-one relationships with each other and each set of such values forms a tuple. These tuples are to be denormalized into multiple columns such that the values in the same row of the multiple columns have a common parent node value in the semi-structured data. To preserve this one-to-one relationship of child node tuples an additional ordinality column is defined at block 750, in an embodiment. The ordinality column is an incrementing integer that has a unique value for each tuple. Thus, the ordinality column preserves the row cardinality for the child node columns in denormalized arrangement 156.

For example, continuing with data guide 154 example in FIG. 4, when the "$.items.parts2" node is selected, denormalizer 134 determines that "$.items.parts2" is an array based on the "datatype" column of data guide 154. As an array, "$.items.parts2" has a many-to-one relationship with its parent node, "$.items", as well as any singleton node that has a one-to-one relationship with "$.items", such as a child node, "$.items.itemName", and a sibling node "$.poDate." Thus, in virtual table 160, according to denormalized arrangement 156, for each row of value(s) for set of column(s) of "$.items.parts2", the corresponding row of values for "$.items.itemName" and "$.poDate" columns is repeated. On the other hand, "$.items.parts2" and "$items.parts" have a many-to-many or no relationship, and therefore NULL values are inserted for the set of columns of "$.items.parts2" in those rows for which values exist in the set of columns for "$items.parts", and vice versa.

From the next rows in data guide 154 after the "$.items.parts2" row, denormalizer 134 also determines that the node has three child nodes: "$.items.parts2.part2Name," "$.items.parts2.parts2Quantity," and "$.items.parts2.diffPart2Name" (also depicted as child nodes in FIG. 6). Accordingly, denormalizer 134 augments denormalized arrangement(s) 156 with a new set of columns definition, which contains an ordinality column for the child nodes.

At blocks 755-760, new columns are defined for scalar properties that are within objects/arrays for which the sets of columns have already been defined at blocks 715-750, in an embodiment. At block 710, if the selected node is for a scalar property, then, at block 755, the datatype for the scalar property is determined. In an embodiment, the datatype is determined by mapping semi-structured data format datatypes to a DBMS datatype. Using data guide 154 for the semi-structured data, denormalizer 134 determines the datatype for the column definition of the selected scalar property node. In some embodiments, data guide 154 contains data type information that has already been mapped into a DBMS data type definition and can be used in a definition of a column in a denormalized arrangement. At block 760, denormalizer 134 defines a column of the determined data type for denormalized arrangement 156.

In the example of data guide 154 in FIG. 4, each of the scalar properties are defined as columns of the corresponding DBMS types. The "min" and "max" columns of data guide 154 provide additional information about the scalar properties such as length of a string or precision and scale of a number. Such additional information may be used in definitions of the corresponding columns in a denormalized arrangement. FIG. 8 depicts an example of denormalized arrangement 156 with a JSON_TABLE operator that has been generated using data guide 154 depicted in FIG. 4.

In a related embodiment, multiple denormalized arrangements 156 are generated from data guide 154. Denormalized arrangements 156 may differ from each based on the amount of hierarchical information on the semi-structured data each contains. The amount is determined based on a level of detail selected by query optimizer 126 for a particular denormalized arrangement.

Different levels of detail may be selected by statistics collector 128 based on the statistics collected for the input semi-structured data. Detail level data may indicate the levels of detail by including information on width and depth of the hierarchy to de-normalize for each denormalized arrangement. In particular, detail level data may indicate the nodes of hierarchy to de-normalize for denormalizer 134. Denormalizer 134 selects the portion of data guide 154 corresponding to the indicated nodes in the detail level data to generate denormalized arrangement 156 according to techniques described herein (particularly, in FIG. 7). For example, if the detail level data indicates that the "add_items" object is the most queried in the input semi-structured data of FIG. 2, then denormalizer 134 may separately process rows 17-24 of data guide 154 of FIG. 4 to generate separate denormalized data arrangement 156 for the "add_items" object as depicted in FIG. 9.

In some embodiments, if detail level data specifies a parent node for de-normalization but excludes a child node of the parent, denormalizer 134 may de-normalize the parent node as a generic type column (such as a large object type or a string type column) that will contain semi-structured data of the child nodes. For example, if detailed level data indicates that child nodes of "$.items.parts[ ]" of FIG. 6 are not queried often, then denormalizer 134 may denormalize "$.items.parts[ ]" as a scalar property rather than an array object with two scalar properties. FIG. 10 shows an example of denormalized arrangement 156 with "$.items.parts[ ]" object as a single column.

In yet another embodiment, the determination about the level of detail to de-normalize is deferred to the run-time phase of query execution. To de-normalize semi-structured data necessary to evaluate the received query, such as query 140, detail level data that contains information on nodes that are necessary to evaluate path expressions is extracted by query optimizer 126. Denormalizer 134 uses the detail level data to select only a portion of data guide 154 corresponding to the extracted nodes to generate denormalized arrangement 156 particular to query 140.

Materializing Denormalized Data Arrangements

In an embodiment, a denormalized arrangement is materialized as PF data or MF data or both. To materialize, data generator 124 applies denormalized arrangement 156 to the input semi-structured data: for example, to either semi-structured data document collection 150 or semi-structured data partition 152. In an embodiment, the DBMS applies denormalized arrangement 156 by executing a relational statement corresponding to denormalized arrangement 156. The execution generates data arranged in a set of column values, virtual table 160, from the input semi-structured data. FIGS. 11A and 11B show an example of virtual table 160 as generated based on the relational statement of denormalized arrangement 156 in FIG. 8.

Virtual table 160 is stored in persistent storage 110 as PF virtual table 108, in an embodiment. Using the techniques described in Mirroring Data Application and Selective Mirroring Application, PF virtual table 108 may be mirrored into MF data 104 as MF virtual table 105, as depicted in FIG. 1A. PF virtual table 108 may be in a different format, such as row major format, while MF virtual table 105 may be in columnar format.

In some embodiments, MF virtual table 105 may be a partition of PF virtual table 108 data. The partition may be determined based on the techniques described in Selective Mirroring Application. Received queries may be executed against both PF virtual table 108 or MF virtual table 106 as described in Mirroring Data Application and Selective Mirroring Application.

In an embodiment, virtual table 160 is generated during the run-time execution of query 140. Once virtual table 160 is generated by data generator 124, query 140 may be executed against virtual table 160 without persistently storing virtual table 160 in persistent storage 110. Rather, virtual table may be kept in volatile memory 102, for example in memory cache 106, while being operated on as part of the execution of query 140.

Processing Semi-Structured Data Queries

In an embodiment in which the received query, query 140, has path expressions for the input semi-structured data, query converter 122 of query optimizer 126 converts query 140 into a relational query to be executed against virtual table 160 as depicted in FIG. 1B. Query converter 122 converts query 140 based on semi-structured data operators specified in query 140 and the detail level of semi-structured data that is necessary to process the data. According to embodiments, non-semi-structured data operators in query 140 are preserved in the relational query; however the sources of data specified are converted to reference virtual table 160.

In an embodiment, query 140 is 1) selecting data from semi-structured data based on the existence of one or more values in the semi-structured data (for example, query 140 contains a JSON_EXISTS( ) operator in the WHERE clause); 2) selecting data from semi-structured data based on a specified arrangement of the semi-structured data (for example, query 140 contains a JSON_TABLE operator in the FROM clause); and/or 3) selecting a scalar value from semi-structured data.

Table 1 below shows conversion examples for queries selecting data from semi-structured data based on the existence of one or more values in the semi-structured data, according to one or more embodiments. In one embodiment, conditions in query 140 exclude conditions on scalar properties of sibling array/object nodes in the hierarchy of semi-structured data document collection 150. Such conditions in query 140 are converted into predicates in the WHERE clause of a relational query against virtual table 160 of denormalized arrangement 156. The conditions on each scalar property node in query 140 are converted into predicates on the columns of virtual table 160 corresponding to the scalar property nodes.

In some embodiments, the converted relational query further joins virtual table 160 with semi-structured data document collection 150 to ensure that all nodes in semi-structured data document collection 150 can be queried in the relational query.

Q1-Q3 queries of Table 1 depict examples where SQL/JSON queries with path expressions are converted to relational SQL queries with predicates on columns of virtual table 160 as depicted in FIG. 10. Unlike the traversal of hierarchy described in the queries of "SQL/JSON Query" column of Table 1, the queries in "Converted SQL Query" of Table 1 may be efficiently executed using scan operations with filtering on the columns specified in the predicates.

In an embodiment in which conditions on existence of one or more values include conditions on scalar properties of sibling array/object nodes of a semi-structured data hierarchy, the conditions are converted into a full self-join of virtual table 160. With the full self-join of virtual table 160, the rows that contain non-NULL values for the sibling nodes are independently available for application of predicates in the converted relational queries. For example, Q4 query of Table 1 has conditions on scalar properties of "items[ ]" and "add_items[ ]", which sibling arrays as depicted in the hierarchy of FIG. 6. Thus, in virtual table of FIG. 11, rows with "rowids" 0-6 and rows with "rowids" 7-8 are to be filtered separately. Accordingly, virtual table 160, JSON_COLLECTION_MD_JTAB, is self-joined using "v1" and "v2" labels.

In a related embodiment, if the sibling arrays have an antecedent node which is also an array, the antecedent node array's ordinality column is designated as the join key for the self-j on to ensure that the same instances of the antecedent node array are compared. In Q5 SQL/JSON query of Table 1 sibling arrays, "parts[ ]" and "parts2[ ]" of the same parent "items[ ]" array (as depicted in FIG. 6) are queried. Accordingly, in Q5 converted SQL relational query, virtual table 160 is self-joined based on the "item_seq" column to ensure that rows for scalar properties of "parts[ ]" and "parts2[ ]" are from the same "items[ ]" array entry.

in virtual table 160, row values for the selected columns may be repetitive. The repetitive rows may be due to a node representing the selected column having multiple children that correspond to other columns in virtual table 160 that are not selected by the query. To remove the repetitive rows, the "DISTINCT" aggregate function is applied to the specified columns in the converted relational query. In some embodiments, the converted relational query further joins virtual table 160 with semi-structured data document collection 150 to ensure that all nodes in semi-structured data document collection 150 can be queried in the relational query.

Q6 and Q7 SQL/JSON queries of Table 2 contain particular data arrangements using JSON_TABLE operators. The particular data arrangements contain only a subset of

TABLE 1

JSON_EXISTS( ) query conversion examples

| Query # | SQL/JSON Query | Converted SQL Relational Query |
|---|---|---|
| Q1 | Select count(*) from JSON_COLLECTION oc where JSON_EXISTS(oc.document, '$?(poNum >= :1 && poDate <= :2)') | Select count(*) from JSON_COLLECTION oc WHERE EXISTS(select 1 from JSON_COLLECTION_MD_JTAB v WHERE v.rowid = oc.rowid and v.poNum >= :1 and v.poDate <= :2) |
| Q2 | Select count(*) from JSON_COLLECTION oc where JSON_EXISTS(oc.document, '$?(poDate <= :1 && exists(items?(itemName == :2 && itemQuantity == :3)') | select count(*) from JSON_COLLECTION oc WHERE EXISTS(select 1 from JSON_COLLECTION_MD_JTAB v WHERE v.rowid = oc.rowid and v.poDate <= :1 and v.itemName ==:2 and v.itemQuantity == :3) |
| Q3 | Select count(*) from JSON_COLLECTION oc where JSON_EXISTS(oc.document, '$?(poDate <= :1 && exists(items?(itemName == :2 && itemQuantity == :3 && exists(parts?(partName == :4 && partQuantity == :5)))') | select count(*) from JSON_COLLECTION oc WHERE EXISTS(select 1 from JSON_COLLECTION_MD_JTAB v WHERE v.rowid = oc.rowid and == :3 v.poDate <= :1 and v.itemName ==:2 and v.itemQuantity and v.partName ==:4 and v.partQuantity == :5) |
| Q4 | Select count(*) from JSON_COLLECTION oc where JSON_EXISTS(oc.document, '$?(poDate <= :1 && exists(items?(itemName == :2 && itemQuantity == :3)) && exists(add_items?(add_itemName == :4 && add_itemQuantity == :5)))') | select count(*) from JSON_COLLECTION oc WHERE EXISTS(select 1 from JSON_COLLECTION_MD_JTAB v, JSON_COLLECTION_MD_JTAB v2, WHERE v.rowid = oc.rowid and v2.rowid = oc.rowid and v.poDate <= :1 and v.itemName ==:2 and v.itemQuantity == :3 and v2.add_itemName ==:4 and v2.add_itemQuantity == :5 |
| Q5 | Select count(*) from JSON_COLLECTION oc where JSON_EXISTS(oc.document, '$?(poDate <= :1 && exists(items? (exists(parts?(partName == :2 && partQuantity == :3)) && (exists(parts2?(part2Name == :4 && part2Quantity == :5))))') | select count(*) from JSON_COLLECTION oc WHERE EXISTS(select 1 from JSON_COLLECTION_MD_JTAB v, JSON_COLLECTION_MD_JTAB v2, WHERE v.rowid = oc.rowid and v2.rowid = oc.rowid and v.poDate <= :1 and v.partName ==:2 and v.partQuantity == :3 and v2.part2Name ==:4 and v2.part2Quantity == :5 and v.item_seq = v2.item_seq |

Table 2 below shows conversion examples for queries selecting data from semi-structured data based on a specified arrangement of the semi-structured data. In an embodiment, query converter 122 converts query 140, which specifies a particular data arrangement of semi-structured data document collection to be queried to a relational query that uses virtual table 160. For each selected column in query 140's specified arrangement, query converter 122 identifies the corresponding column in virtual table 160. The corresponding column is the column in data arrangement 156 that has the same definition as the selected column in the particular data arrangement in query 140. The predicates of query 140 may also be similarly converted to predicates in a relational query by identifying the columns in virtual table 160 corresponding to the columns in the predicates of query 140.

In a related embodiment, virtual table 160 contains columns in addition to those specified in query 140. When the columns corresponding to the specified columns are selected nodes denormalized in data arrangement of FIG. 8. Thus, to filter repetitive rows in virtual table 160 that exist due to the excluded subset of nodes in data arrangement 156, a DISTINCT aggregate function is added to the SELECT clause of the converted Q6, Q7, Q12 and Q13 SQL relational queries, respectively.

In another embodiment, received query 140 specifies selection of array nodes. De-normalizing sibling array nodes is done by producing rows for each sibling array in turn; while non-NULL rows are being produced for a sibling, NULL values are produced for the columns of all other sibling array nodes. Therefore, selecting a sibling array node column may produce multiple rows of NULL values. Accordingly, a NULL filtering predicate may be added for such a column. For example, in the Q8 SQL/JSON query, "items[ ]" array node has sibling array nodes "parts2[ ]" and "add_items," and may have NULL value rows for non-NULL value rows of the sibling array columns. Accordingly, a predicate "v.item_seq is NOT NULL" is added to the WHERE clause of Q8 converted SQL relational query. Similarly, Q9-Q11 and Q13 converted relational SQL queries are generated to contain in the WHERE clause "is NOT NULL" predicate on ordinality columns of the respective selected array columns. Additionally, Q13 query of Table 1 is an example of conversion for a query that selects data from semi-structured data based on a specified arrangement of the semi-structured data as well as based on an existence of one or more values in the semi-structured data.

TABLE 2

JSON_TABLE( ) query conversion examples

| Query # | SQL/JSON Query | Converted SQL Query |
| --- | --- | --- |
| Q6 | SELECT v.*<br>FROM JSON_COLLECTION oc,<br>JSON_TABLE(oc.document FORMAT json , '$ '<br>COLUMNS<br>(<br>    poNum varchar2(10) PATH '$.poNum',<br>    poDate varchar2(12) PATH '$.poDate',<br>    sparse001 varchar2(20) PATH '$.sparse001 ',<br>    sparse002 varchar2(20) PATH '$.sparse002 '<br>) v | SELECT v.poNum, v.poDate, v.sparse001, v.sparse002<br>FROM (SELECT DISTINCT<br>  mv.rowid, mv.poNum, mv.poDate,<br>  mv.sparse001, mv.sparse002<br>FROM JSON_COLLECTION_MD_JTAB mv) v |
| Q7 | SELECT oc.*, v.*<br>FROM JSON_COLLECTION oc,<br>JSON_TABLE(oc.document FORMAT json , '$ '<br>COLUMNS<br>(<br>    poNum varchar2(10) PATH '$.poNum',<br>    poDate varchar2(12) PATH '$.poDate',<br>    sparse001 varchar2(20) PATH '$.sparse001 ',<br>    sparse002 varchar2(20) PATH '$.sparse002 '<br>) v | SELECT oc.*, v.poNum, mv.poDate, mv.sparse001, mv.sparse002<br>FROM JSON_COLLECTION oc,<br>(SELECT DISTINCT<br>  rowid, poNum, poDate,<br>  sparse001, sparse002<br>FROM JSON_COLLECTION_MD_JTAB) mv<br>WHERE mv.rowid = oc.rowid |
| Q8 | SELECT v.*<br>FROM JSON_COLLECTION oc,<br>JSON_TABLE(oc.document FORMAT json , '$ '<br>COLUMNS<br>(<br>    poNum varchar2(10) PATH '$.poNum',<br>    poDate varchar2(12) PATH '$.poDate',<br>    sparse001 varchar2(20) PATH '$.sparse001 ',<br>    sparse002 varchar2(20) PATH '$.sparse002 ',<br>NESTED PATH '$.items[*]'<br>  COLUMNS<br>  (<br>  item_seq for ordinality,<br>  itemName varchar2(10) PATH '$.itemName',<br>  itemPrice varchar2(10) PATH '$.itemPrice',<br>  itemQuantity varchar2(10) PATH '$.itemQuanitty'<br>))<br>) v | SELECT v.poNum, v.poDate, v.sparse001, v.sparse002, v.item_seq, v.itemName, v.itemPrice, v.itemQuantity<br>FROM (SELECT DISTINCT<br>  rowid, poNum, poDate,<br>  sparse001, sparse002, item_seq,<br>itemName, itemPrice, itemQuantity<br>FROM JSON_COLLECTION_MD_JTAB<br>WHERE v.item_seq is NOT NULL) v |
| Q9 | SELECT v.*<br>FROM JSON_COLLECTION oc,<br>JSON_TABLE(oc.document FORMAT json , '$ '<br>COLUMNS<br>(<br>    poNum varchar2(10) PATH '$.poNum',<br>    poDate varchar2(12) PATH '$.poDate',<br>    sparse001 varchar2(20) PATH '$.sparse001 ',<br>    sparse002 varchar2(20) PATH '$.sparse002 ',<br>NESTED PATH '$.add_items[*]'<br>  COLUMNS<br>  (<br>  add_item_seq for ordinality,<br>  add_itemName varchar2(10) PATH '$.add_itemName',<br>  add_itemPrice varchar2(10) PATH '$.add_itemPrice',<br>  add_itemQuantity varchar2(10) PATH '$.add_itemQuanitty',<br>    NESTED PATH '$.add_parts[*]'<br>    COLUMNS<br>    (<br>  add_parts_seq for ordinality,<br>  add_partName varchar2(10) PATH '$.add_partName',<br>  add_partQuantity varchar2(10) PATH '$.add_partQuantity',<br>    add_partQuantity_number number PATH '$.add_partQuantity'<br>    )))<br>) v | SELECT v.poNum, v.poDate, v.sparse001, v.sparse002, v.add_item_seq, v.add_itemName, v.add_itemPrice, v.add_itemQuantity, v.add_parts_seq, v.add_partName, v.add_partQuantity, v.add_partQuantityNumber<br>FROM (SELECT<br>  rowid, poNum, poDate,<br>  sparse001, sparse002, add_item_seq, add_itemName, add_itemPrice, add_itemQuantity, add_parts_seq, add_partName, add_partQuantity, add_partQuantityNumber<br>FROM JSON_COLLECTION_MD_JTAB<br>WHERE add_item_seq is NOT NULL<br>) v<br>OR<br>SELECT<br>  rowid, poNum, poDate,<br>  sparse001, sparse002, add_item_seq, add_itemName, add_itemPrice, add_itemQuantity, add_parts_seq, add_partName, add_partQuantity, add_partQuantityNumber<br>FROM JSON_COLLECTION_MD_JTAB<br>WHERE add_item_seq is NOT NULL |

TABLE 2-continued

JSON_TABLE( ) query conversion examples

| Query # | SQL/JSON Query | Converted SQL Query |
|---|---|---|
| Q10 | SELECT v.*<br>FROM JSON_COLLECTION oc,<br>JSON_TABLE(oc.document FORMAT json , '$ '<br>COLUMNS<br>(<br>    poNum varchar2(10) PATH '$.poNum',<br>    poDate varchar2(12) PATH '$.poDate',<br>    sparse001 varchar2(20) PATH '$.sparse001 ',<br>    sparse002 varchar2(20) PATH '$.sparse002 ',<br>    NESTED PATH '$.items[*]'<br>    COLUMNS<br>    (<br>    item_seq for ordinality,<br>    itemName varchar2(10) PATH '$.itemName',<br>    itemPrice varchar2(10) PATH '$.itemPrice',<br>    itemQuantity varchar2(10) PATH '$.itemQuanitty',<br>    NESTED PATH '$.parts[*]'<br>     COLUMNS<br>     (<br>     parts_seq for ordinality,<br>     partName varchar2(10) PATH '$.partName',<br>     partQuantity varchar2(10) PATH<br>'$.partQuantity'<br>    )<br>))))) v<br>WHERE v.poDate > :1 and v.itemName = :2 and<br>v.itemPrice = :3 and v.partQuantity <=: 4 | SELECT<br>  rowid, poNum, poDate,<br>  sparse001, sparse002, item_seq, itemName, itemPrice,<br>itemQuantity,<br>parts_seq, partName,<br>partQuantity, partQuantityNumber<br>FROM JSON_COLLECTION_MD_JTAB<br>WHERE item_seq is NOT NULL and parts_seq is NOT<br>NULL and poDate > :1 and itemName = :2 and itemPrice = :3<br>and partQuantity <=: 4 |
| Q11 | SELECT oc.*, v.*<br>FROM JSON_COLLECTION oc,<br>JSON_TABLE(oc.document FORMAT json , '$ '<br>COLUMNS<br>(<br>    poNum varchar2(10) PATH '$.poNum',<br>    poDate varchar2(12) PATH '$.poDate',<br>    sparse001 varchar2(20) PATH '$.sparse001 ',<br>    sparse002 varchar2(20) PATH '$.sparse002 ',<br>NESTED PATH '$.items[*]'<br>COLUMNS<br>(<br>    item_seq for ordinality,<br>    itemName varchar2(10) PATH '$.itemName',<br>    itemPrice varchar2(10) PATH '$.itemPrice',<br>    itemQuantity varchar2(10) PATH '$.itemQuanitty'<br>))))) v<br>WHERE v.poDate > :1 and v.itemName = :2 and<br>v.itemPrice = :3 | SELECT oc.*, v.poNum, mv.poDate, mv.sparse001,<br>mv.sparse002<br>FROM JSON_COLLECTION oc,<br>(SELECT DISTINCT<br>  rowid, poNum, poDate,<br>  sparse001, sparse002,<br>item_seq, itemName, itemPrice, itemQuantity<br>FROM JSON_COLLECTION_MD_JTAB<br>WHERE item_seq is NOT NULL and parts_seq is NOT<br>NULL and poDate > :1 and itemName = :2 and itemPrice = :3<br>) mv<br>WHERE mv.rowid = oc.rowid |
| Q12 | SELECT v.*<br>FROM JSON_COLLECTION oc,<br>JSON_TABLE(oc.document FORMAT json , '$ '<br>COLUMNS<br>(<br>    poNum varchar2(10) PATH '$.poNum',<br>    poDate varchar2(12) PATH '$.poDate',<br>    sparse001 varchar2(20) PATH '$.sparse001 ',<br>    sparse002 varchar2(20) PATH '$.sparse002 ',<br>    NESTED PATH '$.items[*]'<br>    COLUMNS<br>    (<br>    item_seq for ordinality,<br>    itemName varchar2(10) PATH '$.itemName',<br>    itemPrice varchar2(10) PATH '$.itemPrice',<br>    itemQuantity varchar2(10) PATH '$.itemQuanitty'<br>),<br>NESTED PATH '$.add_items[*]'<br>    COLUMNS<br>    (<br>    add_item_seq for ordinality,<br>    add_itemName varchar2(10) PATH<br>'$.add_itemName',<br>    add_itemPrice varchar2(10) PATH<br>'$.add_itemPrice',<br>    add_itemQuantity varchar2(10) PATH<br>'$.add_itemQuanitty'<br>)))) v | SELECT<br>  poNum, poDate, sparse001, sparse002, item_seq,<br>itemName, itemPrice, itemQuantity, add_item_seq,<br>add_itemName, add_itemPrice, add_itemQuantity<br>FROM<br>(SELECT DISTINCT rowid, poNum, poDate, sparse001,<br>sparse002, item_seq, itemName, itemPrice, itemQuantity,<br>add_item_seq, add_itemName, add_itemPrice,<br>add_itemQuantity<br>FROM JSON_COLLECTION_MD_JTAB<br>) |

TABLE 2-continued

JSON_TABLE( ) query conversion examples

| Query # | SQL/JSON Query | Converted SQL Query |
|---|---|---|
| Q13 | SELECT SUM(to_number(v.itemQuantity) ) * to_number(v.itemPrice)) FROM JSON_COLLECTION oc, JSON_TABLE(oc.document FORMAT json , '$.items[*]' COLUMNS ( itemQuantity varchar2(10) PATH '$.itemQuantity', itemPrice varchar2(10) PATH '$.itemPrice')) v WHERE JSON_EXISTS(oc.document, '$.poDate >= :1 && exists($.items.parts?($.partName=:2))') | SELECT SUM(to_number(v.itemQuantity) * to_number(v.itemPrice)) FROM JSON_COLLECTION oc, ( SELECT DISTINCT rowid, itemQuantity, itemPrice FROM JSON_COLLECTION_MD_JTAB mv2 WHERE mv2.rowid = oc.rowid AND item_seq is NOT NULL) v WHERE EXISTS (SELECT 1 FROM JSON_COLLECTION_MD_JTAB mv WHERE oc.rowid = mv.rowid AND mv.poDate >= :1 AND mv.partName = :2) |

Table 3 below shows conversion examples for selecting scalar property values from semi-structured data. In an embodiment, query 140 selects data from semi-structured data document collection 150 by referencing scalar property nodes of the semi-structured data without semi-structured data specific operators. Query converter 122 converts each scalar property node in query 140 to the column of virtual table 160 corresponding to the scalar property node in denormalized arrangement 156.

Q14-Q17 SQL/JSON queries of Table 3 include direct references to scalar property nodes of semi-structured data document collection 150 as depicted in hierarchy in FIG. 6. Q14 and Q15 SQL/JSON queries contain such references as part of predicates in the WHERE clause. Q16 SQL/JSON query contains such a reference in the "ORDER BY" clause, while Q17 SQL/JSON query contains such a reference in the "GROUP BY" clause. In Q14-Q17 converted relational queries, the references to scalar property nodes are replaced by the corresponding columns based on denormalized arrangement 156 as depicted in FIG. 8.

In an embodiment, query 140 specifies a semi-structured data operator that returns a scalar value for a referenced scalar property node. Query converter 122 generates a relational query by converting such an operator on the referenced scalar property node into references to the column of virtual table 160 corresponding to the referenced scalar property nodes in denormalized arrangement 156. In some embodiments, the converted relational query further joins virtual table 160 with semi-structured data document collection 150 to ensure that all nodes in semi-structured data document collection 150 can be queried in the relational query.

Q18 and Q19 SQL/JSON queries of Table 3 contains JSON_VALUE( ) function calls that takes as an input the path to a scalar property node for which the value is returned. Query converter 122 converts Q18 and Q19 SQL/JSON queries into Q18 and Q19 SQL/JSON converted SQL relational queries, in which JSON_VALUE( ) function calls are replaced by references to relational columns of virtual table 160. The relational columns of virtual table 160 correspond to the path specified as parameters to the function based on denormalized arrangement 156 as depicted in FIG. 8.

TABLE 3

JSON_QUERY(ASIS) and JSON_VALUE( ) query conversion examples

| Query # | SQL/JSON Query | Converted SQL Relational Query |
|---|---|---|
| Q14 | SELECT count(*) FROM JSON_COLLECTION oc WHERE oc.sparse002 = :1 | SELECT count(*) FROM JSON_COLLECTION oc WHERE EXISTS( SELECT 1 FROM JSON_COLLECTION_MD_JTAB mv WHERE sparse002 = :1 AND mv.rowid = oc.rowid) |
| Q15 | SELECT oc.poNum, oc.poDate, oc.sparse001 FROM JSON_COLLECTION oc WHERE oc.sparse002 = :1 | SELECT v.poNum, v.poDate, v.sparse001 FROM (SELECT DISTINCT mv.rowid, mv.poNum, mv.poDate, mv.sparse001 FROM JSON_COLLECTION_MD_JTAB mv WHERE mv.sparse002 = :1) v |
| Q16 | SELECT oc.poNum, oc.poDate, oc.sparse001 FROM JSON_COLLECTION oc WHERE oc.sparse002 = :1 ORDER BY oc.poNum | SELECT v.poNum, v.poDate, v.sparse001 FROM (SELECT DISTINCT mv.rowid, mv.poNum, mv.poDate, mv.sparse001 FROM JSON_COLLECTION_MD_JTAB mv WHERE mv.sparse002 = :1) v ORDER BY v.poNum |
| Q17 | SELECT MIN(oc.poDate), MAX(oc.poDate) FROM JSON_COLLECTION oc GROUP BY oc.sparse002 | SELECT MIN(v.poDate), MAX(v.poDate) FROM (SELECT DISTINCT mv.rowid, mv.poDate, mv.sparse002 FROM JSON_COLLECTION_MD_JTAB mv ) v GROUP BY v.sparse002 |
| Q18 | SELECT JSON_VALUE(oc.document, '$.items[2].itemName), | SELECT (SELECT DISTINCT itemName FROM JSON_COLLECTIION_MD_JTAB mv1 |

TABLE 3-continued

JSON_QUERY(ASIS) and JSON_VALUE( ) query conversion examples

| Query # | SQL/JSON Query | Converted SQL Relational Query |
|---|---|---|
|  | JSON_VALUE(oc.document, '$.add_items[3].add_itemPrice) FROM JSON_COLLECTION oc | WHERE mv1.item_seq = 3 /* ordinality column is 1 based */ AND mv1.rowid = oc.rowid), (SELECT DISTINCT add_itemPrice FROM JSON_COLLECTIION_MD_JTAB mv1 WHERE mv1.add_item_seq = 4 /* ordinality column is 1 based */ AND mv1.rowid = oc.rowid FROM JSON_COLLECTION oc |
| Q19 | SELECT count(*) FROM JSON_COLLECTION oc WHERE JSON_VALUE(oc.document, '$.items[2].itemName) = :1 AND JSON_VALUE(oc.document, '$.add_items[3].add_itemPrice) = :2 | SELECT count(*) FROM JSON_COLLECTION oc WHERE (SELECT 1 FROM JSON_COLLECTIION_MD_JTAB mv1, JSON_COLLECTIION_MD_JTAB mv2 WHERE mv1.item_seq = 3 and mv1.itemName = :1 mv2.add_item_seq = 4 and mv2.add_itemPrice = :2 and mv1.rowid = oc.rowid and mv2.rowid = oc.rowid) |

In an embodiment, the relational query that was generated by converting query 140 by query converter 122 is executed by DBMS 100 against virtual table 160. The execution produces result set 165, which is returned to the requester of query 140.

Each of query optimizer 126, statistics collector 128, query converter 122, data optimizer 130, data generator 124, data guide generator 132, and denormalizer 134 are part of one or more computer systems of DBMS 100 and may be implemented in software, hardware, or a combination of software and hardware. For example, one or more of query optimizer 126, statistics collector 128, query converter 122, data optimizer 130, data generator 124, data guide generator 132, denormalizer 134 may be implemented using stored program logic.

Database Management Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of compute nodes that may store one or more tables. The DBMS may manage tables stored on the cluster of compute nodes similar to managing tables stored in persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected compute nodes that share access to the same database. Typically, the compute nodes are interconnected via a network and share access, in varying degrees, to shared storage, e.g. shared access to a set of disk drives and data blocks stored thereon. The compute nodes in a multi-node DBMS may be in the form of a group of computers (e.g. work stations, personal computers) that are interconnected via a network. Alternately, the compute nodes may be the compute nodes of a grid, which is composed of compute nodes in the form of server blades interconnected with other server blades on a rack.

Each compute node in a multi-node DBMS hosts a database server. A server, such as a database server, is a combination of integrated software components and an allocation of computational resources, such as memory, a compute node, and processes on the compute node for executing the integrated software components on a processor, the combination of the software and computational resources being dedicated to performing a particular function on behalf of one or more clients.

Resources from multiple compute nodes in a multi-node DBMS can be allocated to running a particular database server's software. Each combination of the software and allocation of resources from a compute node is a server that is referred to herein as a "server instance" or "instance". A database server may comprise multiple database instances, some or all of which are running on separate computers, including separate server blades.

Storage of Semi-Structured Data Document Collection

Various types of storage mechanisms are used to store semi-structured data, such as XML or JSON documents. One type of storage mechanism stores semi-structured data as one or more text files in a file system. As mentioned previously, another type of mechanism for storing semi-structured data is a DBMS. In a DBMS, semi-structured data may be stored in a row of a table and nodes of the semi-structured data are stored in separate columns in the row. The entire contents of semi-structured data may also be stored in a lob (large object) in a column. Semi-structured data may be shredded and stored as a hierarchy of objects in a database; each object is an instance of an object class and stores one or more elements of a hierarchical node of the semi-structured data. Tables and/or objects of a database system that hold hierarchical nodes are referred to herein as base tables or objects.

Binary-token encoding is another form in which semi-structured data may be stored in a database. Binary-token encoding generates is a compact binary representation of semi-structured data that is designed to reduce the size of hierarchical data objects. One of the ways binary-token encoding encodes hierarchical data objects is by representing strings with fixed values.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
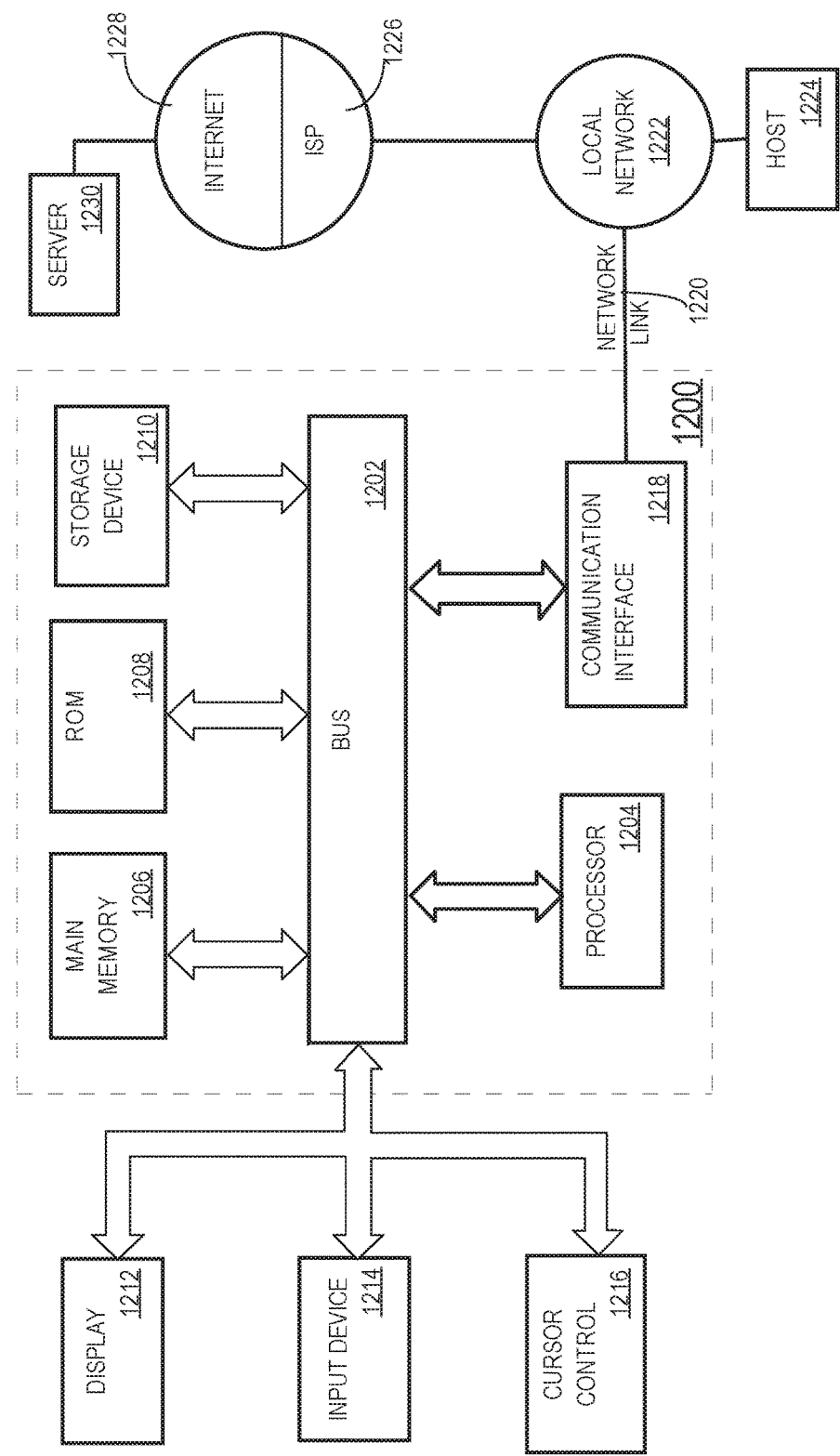
FIG. 12 is a block diagram illustrating a computer system that may be used to implement the techniques described herein.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory (also referred herein as "volatile memory") 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    maintaining, by a database server, semi-structured hierarchical data on persistent storage;
    wherein a schema for the semi-structured hierarchical data comprises a tree of nodes in a hierarchical relationship, each node of the tree of nodes having a cardinality relationship with at least one other node in the tree of nodes with an immediate hierarchical relationship with said each node;
    generating a denormalized arrangement defining a set of columns for a table, comprising rows, that is managed by the database server, wherein each column of said set of columns corresponds to respective one or more nodes of said tree of nodes, the generating comprising:
        for each column in said set of columns, determining a data type for said each column based on a data type of each node of the respective one or more nodes of said column, and
        determining a cardinality relationship between column values in a first column of said set of columns with column values in a second column of said set of columns based on a cardinality relationship between respective one or more nodes of said first column and respective one or more nodes of said second column;
        wherein the cardinality relationship between column values in the first column of said set of columns with column values in the second column is:
            a many-to-one relationship, wherein multiple column in the first column of the set of columns, can correspond to a particular value in the second column,
            a one-to-one relationship, wherein a single value, in the first column, corresponds to at most one value in the second column, or
            a many-to-many or no relationship, wherein no value in the first column corresponds to any value in the second column; and
    storing at least a portion of the semi-structured hierarchical data into the table based on the denormalized arrangement.

2. The method of claim 1, wherein the relationship is determined to be a many-to-one relationship, and the method further comprising:
    for each row of a subset of the rows in said table:
        storing each of the multiple column values in the first column;
        storing duplicates of the particular value in said each row of the second column of the table.

3. The method of claim 1, wherein the relationship is determined to be a many-to-many relationship or no relationship, and the method further comprising:
    for each row, of a subset of the rows, that store non-NULL values in the first column, storing NULL values in said each row of the second column of the table; and
    for each particular row of non-NULL values in the second column, storing NULL values in said each particular row of the first column of the table.

4. The method of claim 1, wherein the relationship is determined to be a one-to-one relationship, and the method further comprising:
for a particular row storing the single value in the first column, storing said at most one value in the particular row of the second column of the table.

5. The method of claim 1, further comprising:
maintaining, by the database server, on the persistent storage a collection of documents that includes the semi-structured hierarchical data;
selecting the semi-structured hierarchical data from the collection of documents based on statistics data extracted from previous executions of queries on the collection of documents.

6. The method of claim 1, further comprising:
maintaining, by the database server, a collection of documents on the persistent storage;
receiving a query for the collection of documents;
extracting, from the query, object information regarding objects, in the collection of documents, used in the query;
selecting the semi-structured hierarchical data from the collection of documents based on the object information.

7. The method of claim 1, further comprising:
generating a data guide from the semi-structured hierarchical data;
based on the data guide:
determining one or more data types for the respective one or more nodes in the tree of nodes; and
determining the hierarchical relationship of the respective one or more nodes in the tree of nodes with respect to other nodes in the tree of nodes.

8. The method of claim 1, wherein the generating further comprises:
receiving a query for a collection of documents;
extracting, from the query, object information regarding objects, in the collection of documents, used in the query; and
based on the object information, selecting the respective one or more nodes in the tree of nodes for which to generate the set of columns of the denormalized arrangement.

9. The method of claim 1, further comprising:
selecting the respective one or more nodes in the tree of nodes for which to generate the set of columns of the denormalized arrangement based on statistics data extracted from previous executions of queries on a collection of documents.

10. The method of claim 1, wherein the respective one or more nodes in the tree of nodes are scalar property nodes.

11. The method of claim 1, further comprising:
generating, for each node in the tree of nodes that is determined to be an array, one or more particular columns for the set of columns of the denormalized arrangement.

12. The method of claim 1, further comprising:
generating a number-typed column definition, in the set of columns of the denormalized arrangement, for each node, in the tree of nodes, that has a plurality of child nodes and is determined to be an array.

13. The method of claim 1, wherein storing at least the portion of the semi-structured hierarchical data into the table based on the denormalized arrangement further comprises storing said portion of the semi-structured hierarchical data in a mirror data format that includes a compression of said portion of the semi-structured hierarchical data in volatile memory of the database server.

14. One or more non-transitory computer-readable media storing instructions which,
when executed by one or more hardware processors, cause:
maintaining, by a database server, semi-structured hierarchical data on persistent storage;
wherein a schema for the semi-structured hierarchical data comprises a tree of nodes in a hierarchical relationship, each node of the tree of nodes having a cardinality relationship with at least one other node in the tree of nodes with an immediate hierarchical relationship with said each node;
generating a denormalized arrangement defining a set of columns for a table, comprising rows, that is managed by the database server, wherein each column of said set of columns corresponds to respective one or more nodes of said tree of nodes, the generating comprising:
for each column in said set of columns, determining a data type for said each columns based on a data type of each node of the respective one or more nodes of said column, and
determining a cardinality relationship between column values in a first column of said of columns with column values in a second column of said set of columns based on a cardinality relationship between respective one or more nodes of said first column and respective one or more nodes of said second column;
wherein the cardinality relationship between column values in the first column of said set of columns with column values in the second column is:
a many-to-one relationship, wherein multiple column values in the first column of the set of columns, can correspond to a particular value in the second column,
a one-to-one relationship, wherein a single value, in the first column, corresponds to at most one value in the second column, or
a many-to-many or no relationship, wherein no value in the first column corresponds to any value in the second column; and
storing at least a portion of the semi-structured hierarchical data into the table based on the denormalized arrangement.

15. The one or more non-transitory computer-readable media of claim 14, wherein the relationship is determined to be a many-to-one relationship, and the instructions further include instructions which, when executed by the one or more hardware processors, cause:
for each row of a subset of the rows in said table:
storing each of the multiple column values in the first column;
storing duplicates of the particular value in said each row of the second column of the table.

16. The one or more non-transitory computer-readable media of claim 14, wherein the relationship is determined to be a many-to-many relationship or no relationship, and the instructions further include instructions which, when executed by the one or more hardware processors, cause:
for each row, of a subset of the rows, that store non-NULL values in the first column, storing NULL values in said each row of the second column of the table; and
for each particular row of non-NULL values in the second column, storing NULL values in said each particular row of the first column of the table.

17. The one or more non-transitory computer-readable media of claim 14, wherein the relationship is determined to be a one-to-one relationship, and the instructions further include instructions which, when executed by the one or more hardware processors, cause, for a particular row storing the single value in the first column, storing said at most one value in the particular row of the second column of the table.

18. The one or more non-transitory computer-readable media of claim 14, wherein the instructions further include instructions which, when executed by the one or more hardware processors, cause:
   maintaining, by the database server, on the persistent storage a collection of documents that includes the semi-structured hierarchical data;
   selecting the semi-structured hierarchical data from the collection of documents based on statistics data extracted from previous executions of queries on the collection of documents.

19. The one or more non-transitory computer-readable media of claim 14, wherein the instructions further include instructions which, when executed by the one or more hardware processors, cause:
   maintaining, by the database server, a collection of documents on the persistent storage;
   receiving a query for the collection of documents;
   extracting, from the query, object information regarding objects, in the collection of documents, used in the query;
   selecting the semi-structured hierarchical data from the collection of documents based on the object information.

20. The one or more non-transitory computer-readable media of claim 14, wherein the instructions further include instructions which, when executed by the one or more hardware processors, cause:
   generating a data guide from the semi-structured hierarchical data;
   based on the data guide:
      determining one or more data types for the respective one or more nodes in the tree of nodes; and
      determining the hierarchical relationship of the respective one or more nodes in the tree of nodes with respect to other nodes in the tree of nodes.

21. The one or more non-transitory computer-readable media of claim 14, wherein the instructions further include instructions which, when executed by the one or more hardware processors, cause:
   receiving a query for a collection of documents;
   extracting, from the query, object information regarding objects, in the collection of documents, used in the query; and
   based on the object information, selecting the respective one or more nodes in the tree of nodes for which to generate the set of columns of the denormalized arrangement.

22. The one or more non-transitory computer-readable media of claim 14, wherein the instructions further include instructions which, when executed by the one or more hardware processors, cause:
   selecting the respective one or more nodes in the tree of nodes for which to generate the set of columns of the denormalized arrangement based on statistics data extracted from previous executions of queries on a collection of documents.

23. The one or more non-transitory computer-readable media of claim 14, wherein the respective one or more nodes in the tree of nodes are scalar property nodes.

24. The one or more non-transitory computer-readable media of claim 14, wherein the instructions further include instructions which, when executed by the one or more hardware processors, cause: generating, for each node in the tree of nodes that is determined to be an array, one or more particular columns for the set of columns of the denormalized arrangement.

25. The one or more non-transitory computer-readable media of claim 14, wherein the instructions further include instructions which, when executed by the one or more hardware processors, cause: generating a number-typed column definition, in the set of columns of the denormalized arrangement, for each node, in the tree of nodes, that has a plurality of child nodes and is determined to be an array.

26. The one or more non-transitory computer-readable media of claim 14, wherein the instructions include instructions which, when executed by the one or more hardware processors, cause: storing said portion of the semi-structured hierarchical data in a mirror data format that includes a compression of said portion of the semi-structured hierarchical data in volatile memory of the database server.

\* \* \* \* \*

UNITED STATES PATENT AND TRADEMARK OFFICE
CERTIFICATE OF CORRECTION

PATENT NO. : 10,191,944 B2
APPLICATION NO. : 15/078713
DATED : January 29, 2019
INVENTOR(S) : Liu et al.

Page 1 of 1

It is certified that error appears in the above-identified patent and that said Letters Patent is hereby corrected as shown below:

In the Specification

In Column 2, Line 66, delete "FIG." and insert -- FIGS. --, therefor.

In Column 3, Line 1, delete "FIG." and insert -- FIGS. --, therefor.

In Column 13, Line 7, delete "self-j on" and insert -- self-join --, therefor.

In the Claims

In Column 26, Lines 38-39, in Claim 1, after "multiple column" insert -- values --.

In Column 28, Line 22, in Claim 14, delete "columns" and insert -- column --, therefor.

In Column 28, Line 26, in Claim 14, after "said" insert -- set --.

Signed and Sealed this
Fourth Day of February, 2020

Andrei Iancu
*Director of the United States Patent and Trademark Office*